United States Patent [19]
Yamanishi

[11] Patent Number: 4,631,577
[45] Date of Patent: Dec. 23, 1986

[54] IMAGE FORMING APPARATUS DISPLAYING THE STEPS OF THE IMAGE FORMING PROCESS

[75] Inventor: Eiichi Yamanishi, Yokohama, Japan

[73] Assignee: Kabushiki Kaisha Toshiba, Kawasaki, Japan

[21] Appl. No.: 635,161

[22] Filed: Jul. 27, 1984

[30] Foreign Application Priority Data

Aug. 1, 1983 [JP] Japan .................................. 58-140870
May 1, 1984 [JP] Japan .................................. 59-088045

[51] Int. Cl.⁴ ........................ H04N 1/46; H04N 1/00; G01D 15/10; G03G 15/01
[52] U.S. Cl. .................................... 358/75; 358/256; 358/280; 346/76 PH; 355/4; 355/14 C
[58] Field of Search ............ 358/75, 75 IJ, 78, 80, 358/256, 280; 355/4, 14 C; 346/76 PH

[56] References Cited

U.S. PATENT DOCUMENTS

4,403,850 9/1983 Masuda ........................... 355/14 C
4,475,806 10/1984 Daughton et al. ............... 355/14 C

FOREIGN PATENT DOCUMENTS

0059081 9/1982 European Pat. Off. .......... 355/14 C
3324784 1/1984 Fed. Rep. of Germany .... 355/14 C
143980 9/1982 Japan .............................. 358/256 A
150858 9/1982 Japan .............................. 355/14 C
161468 9/1983 Japan .............................. 358/256 A

*Primary Examiner*—James J. Groody
*Assistant Examiner*—Randall S. Svihla
*Attorney, Agent, or Firm*—Cushman, Darby & Cushman

[57] ABSTRACT

A thermal transfer color copying machine reads out an image signal of a document by scanning it, heats a thermal head, and transfers images having respective colors to a copying paper sheet from an ink ribbon to obtain a color copy. The copying machine has a pattern display unit for graphically and schematically representing a paper feed cassette, a copying paper sheet, a convey path of the copying paper sheet, a platen roller, a thermal head, an ink ribbon, a discharging path of a color copied paper sheet and the like, thereby representing the actual operation of the copying machine, i.e., a position of the copying paper sheet, which thermally transferred colors have been transferred, thermally transferring colors are in the process of being transferred, and which colors are to be transferred to the copying sheet.

8 Claims, 82 Drawing Figures

FIG. 14A (POWER SW)
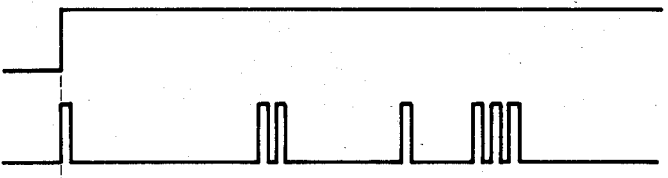
FIG. 14B (DATA SIG)
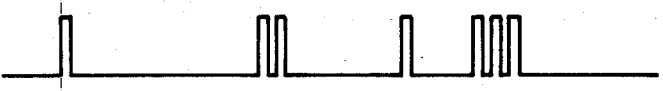
FIG. 14C (CLOCK SIG)
FIG. 14D (LATCH SIG)
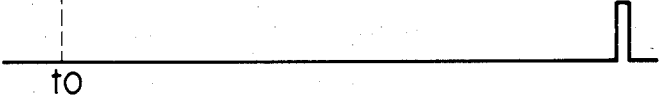
t0
FIG. 15A (DRIVE PULSE)
FIG. 15B (DRIVE PULSE)
FIG. 15C (COMMON)
FIG. 15D
FIG. 15E
FIG. 15F
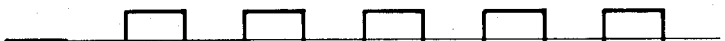
FIG. 15G

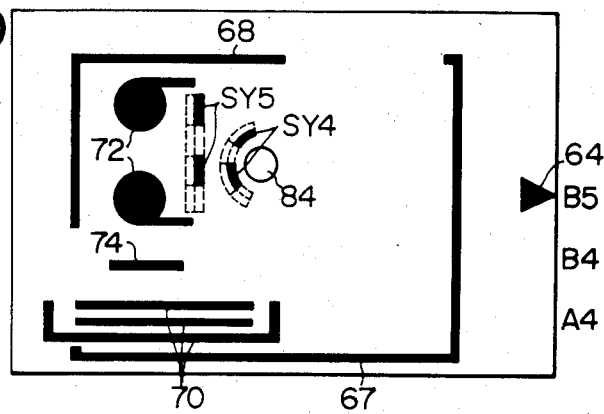
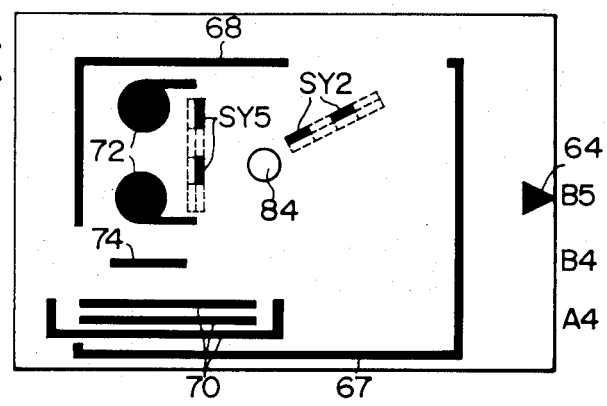
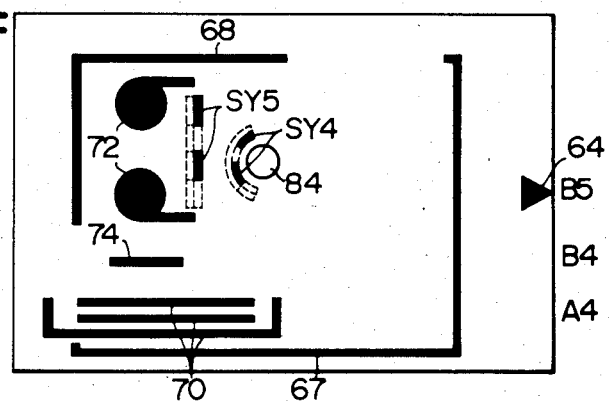

FIG. 20A  FIG. 20B  FIG. 20C
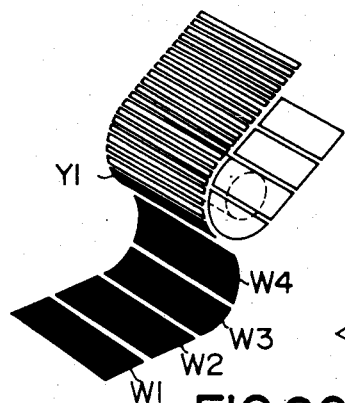
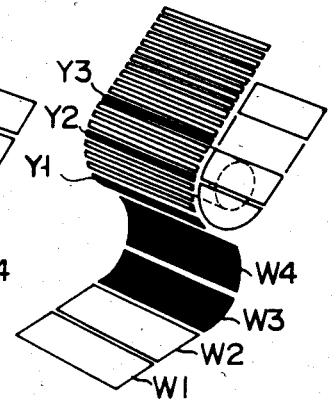
FIG. 20D  FIG. 20E  FIG. 20F
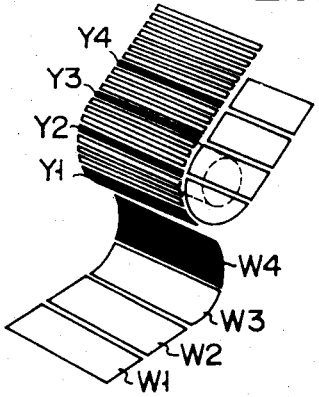
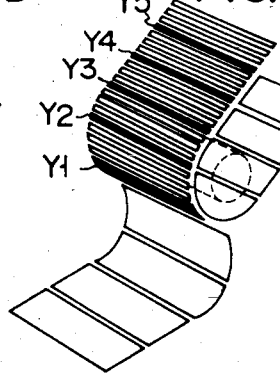
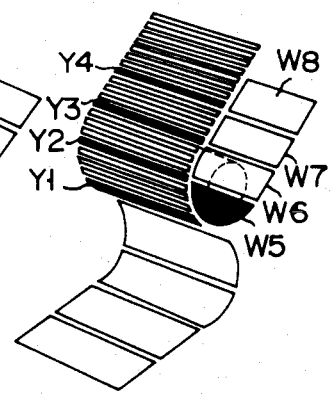
FIG. 20G  FIG. 20H  FIG. 20I
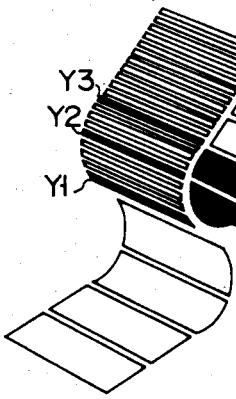
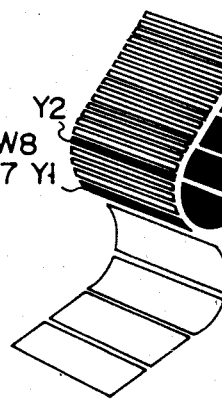
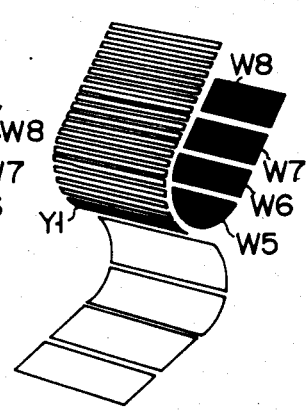

IMAGE FORMING APPARATUS DISPLAYING THE STEPS OF THE IMAGE FORMING PROCESS

BACKGROUND OF THE INVENTION

The present invention relates to an image forming apparatus for forming a color image.

A thermal transfer color copying machine has been recently developed as an image forming apparatus of this type. In this copying machine, a document is scanned by an optical scanner to read an image signal of the document. Then, the image signal is separated into color component signals, and the color component signals are stored in a memory. The color component signals are read for each color component, and are supplied to a thermal head. Using an ink ribbon, respective color component images are transferred to a paper sheet to overlap each other, thereby obtaining a full color copy.

However, in this machine, as compared to a conventional monochrome electrophotographic copying machine, the copying time is prolonged by the number of times corresponding to the number of color components. For this reason, during the copying operation, an operator must wait without knowing how the copying process is proceeding and when it will be completed.

SUMMARY OF THE INVENTION

It is an object of the present invention to provide an image forming apparatus which can signal to the operator the forming process of a color image.

This object can be realized by an image forming apparatus comprising an image forming unit for forming a color image on an image forming medium by forming images of respective colors to overlap each other and a displaying unit for indicating respective colors of an image formed by the image forming unit.

BRIEF DESCRIPTION OF THE DRAWINGS

FIGS. 14A to 14D are timing charts sequentially showing operations of a main controller;

FIGS. 15A to 15G are timing charts sequentially showing operations of the LCD driver;

FIGS. 20A to 20I are views showing displaying states of the pattern display unit of the operation panel during the formation of a yellow image of the second embodiment;

DETAILED DESCRIPTION OF THE PREFERRED EMBODIMENTS

Figure 1:
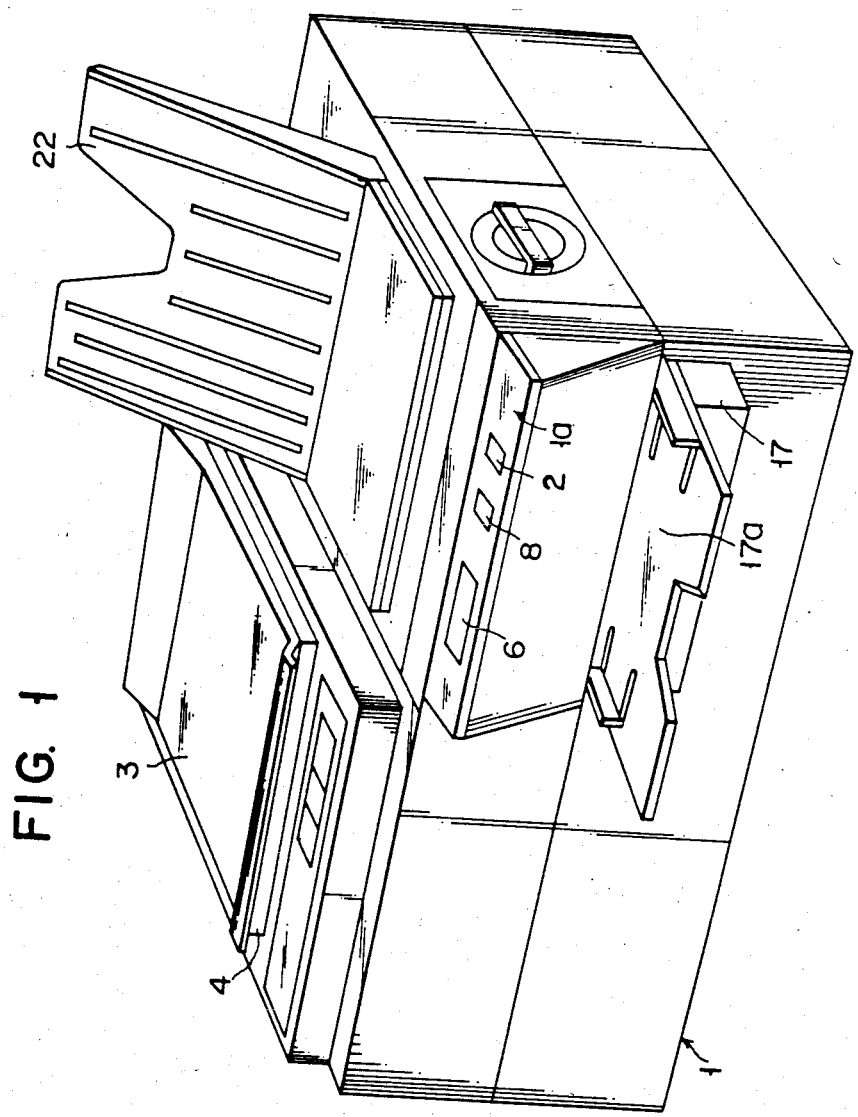
FIG. 1 is a perspective view schematically showing a thermal transfer color copying machine of a first embodiment of an image forming apparatus according to the present invention.
Figure 2:
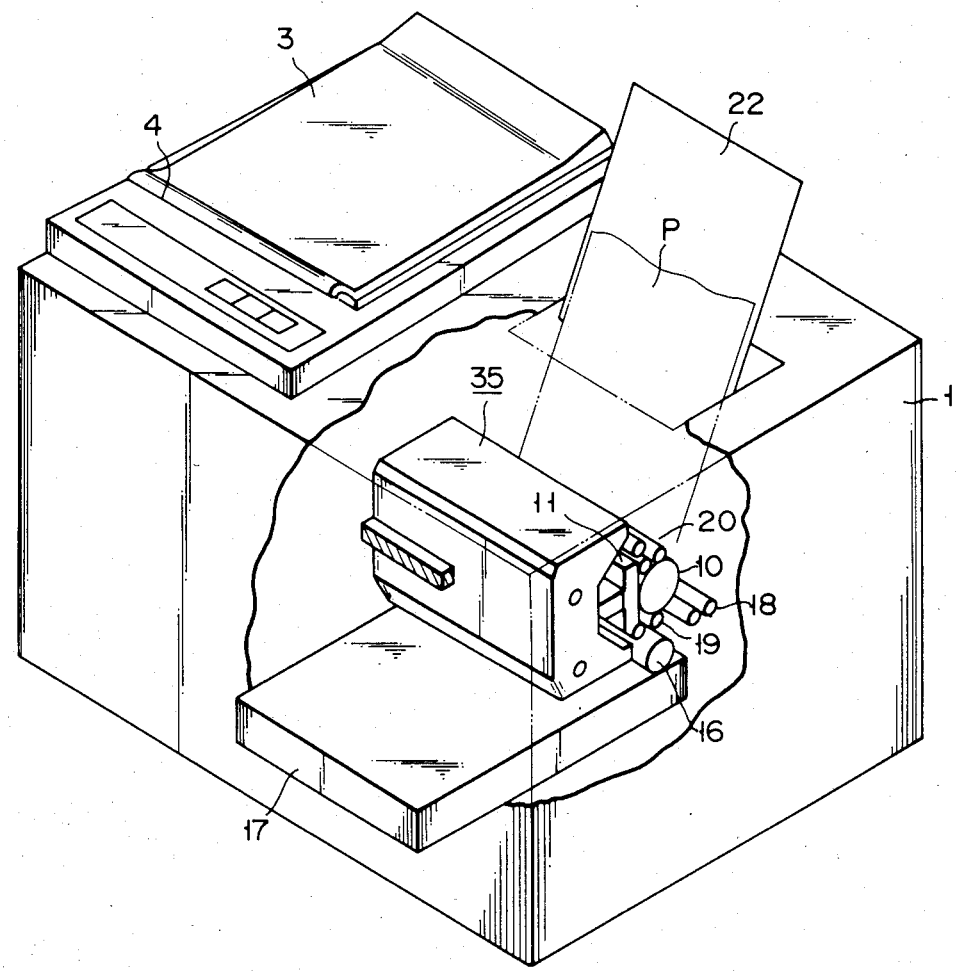
FIG. 2 is a partially broken perspective view of FIG. 1 for explaining a structure of the first embodiment.
Figure 3:
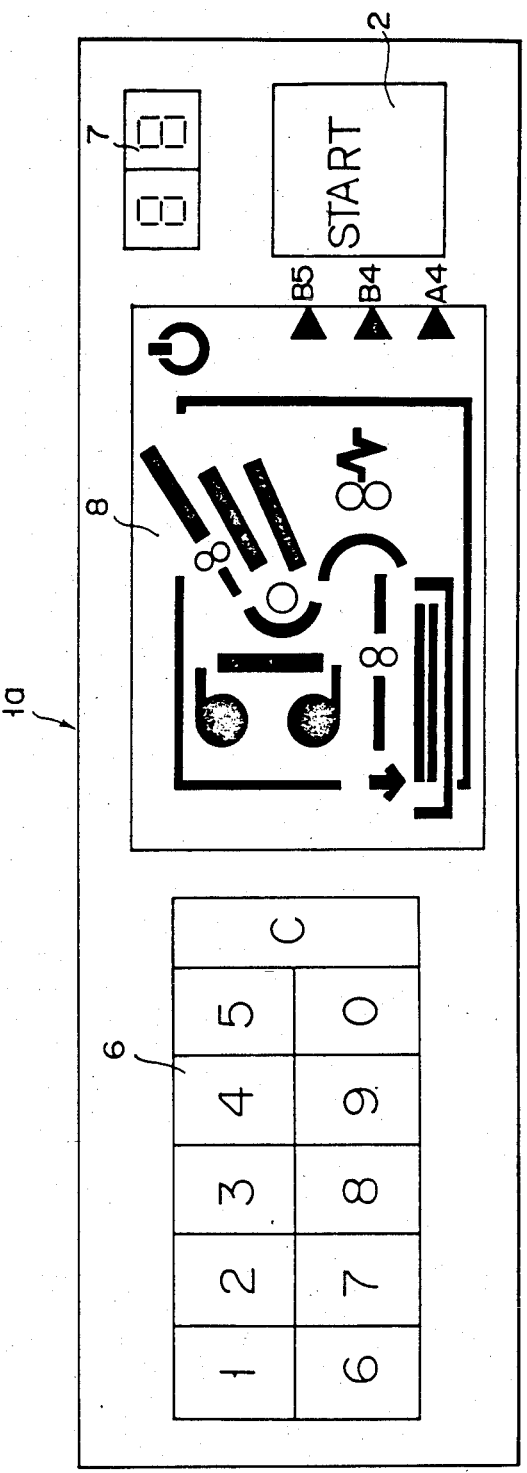
FIG. 3 is a plan view of an operation panel of the first embodiment.

A first embodiment of an image forming apparatus according to the present invention will now be described with reference to the accompanying drawings. A thermal transfer color copying machine will be described hereafter as an embodiment of the image forming apparatus. FIGS. 1 and 2 are schematic perspective views of the thermal transfer color copying machine. An operation panel 1a is arranged on a front side of an upper surface of a copying machine main body 1. As shown in FIG. 3, the operation panel 1a comprises a start key 2 for initiating a copying operation, ten keys 6 for inputting a preset number of copying sheets, a numeric display unit 7 for displaying the preset number, and a pattern display unit 8 for displaying the copying processing states on which schematic illustrations of the copying machine components are represented as patterns. A document table 4 on which a document D is placed and a document cover 3 whose end is fixed on the document table 4 to be freely opened/closed are arranged on the left side of an upper surface of the main body 1. The document table 4 is made of transparent glass. A scanning unit for reading an image signal by scanning a document D is provided below the document table 4 in the main body 1. An image forming unit for forming a color copy of the document D in correspondence with the image signal is provided at the right side of the main body 1. A color copy is discharged to a discharging tray 22 provided at the upper right side of a surface of the main body 1. Note that a paper feed cassette 17, storing paper sheets therein, is loaded at the right side of the front surface of the main body 1. A manual paper feed port 17a for manually feeding a paper sheet therethrough is provided in the vicinity of the paper feed cassette 17.

Figure 4:
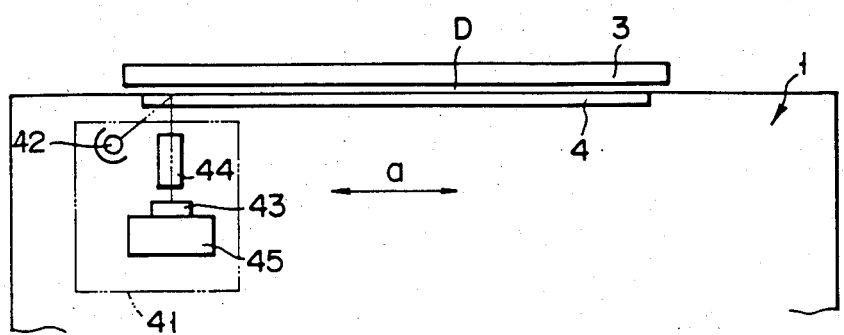
FIG. 4 is a sectional view of a document scanning unit of the first embodiment.
Figure 5:
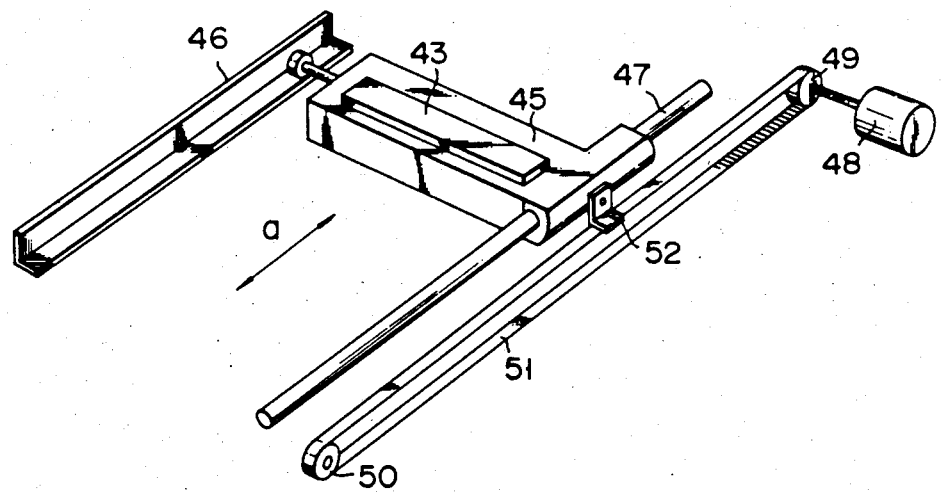
FIG. 5 is a perspective view of the document scanning unit.

The document scanning unit has the construction as shown in FIGS. 4 and 5. The document table 4 is fixed on the main body 1. A scanner 41 is provided below the document table 4 for reading the image signal by optically scanning the document D set on the document table 4 by reciprocating along the direction of arrow a of FIGS. 4 and 5. The scanner 41 comprises an exposure lamp 42 for exposing the document D, a photoelectric converter 43 for receiving light reflected by the document D, an optical system 44, such as a lens, for leading the light reflected by the document D to the photoelectric converter 43, and a carriage 45 for supporting these components. The photoelectric converter 43 generates image signals as color signals of green, yellow and cyan and mainly comprises, e.g., a CCD line image sensor. The carriage 45 is reciprocally guided by a guide rail 46 and a guide shaft 47 along the arrow a of FIG. 5. A drive pulley 49, driven by a reversible scanning motor 48, is provided near one end side of the guide shaft 47. An idle pulley 50 is provided near the other end side of the guide shaft 47. A timing belt 51 is looped between the drive and idle pulleys 49 and 50. One point of the timing belt 51 is fixed on the carriage 45 through a fixing member 52, and the carriage 45 is linearly moved by the forward or reverse rotation of the scanning motor 48.

Figure 6:
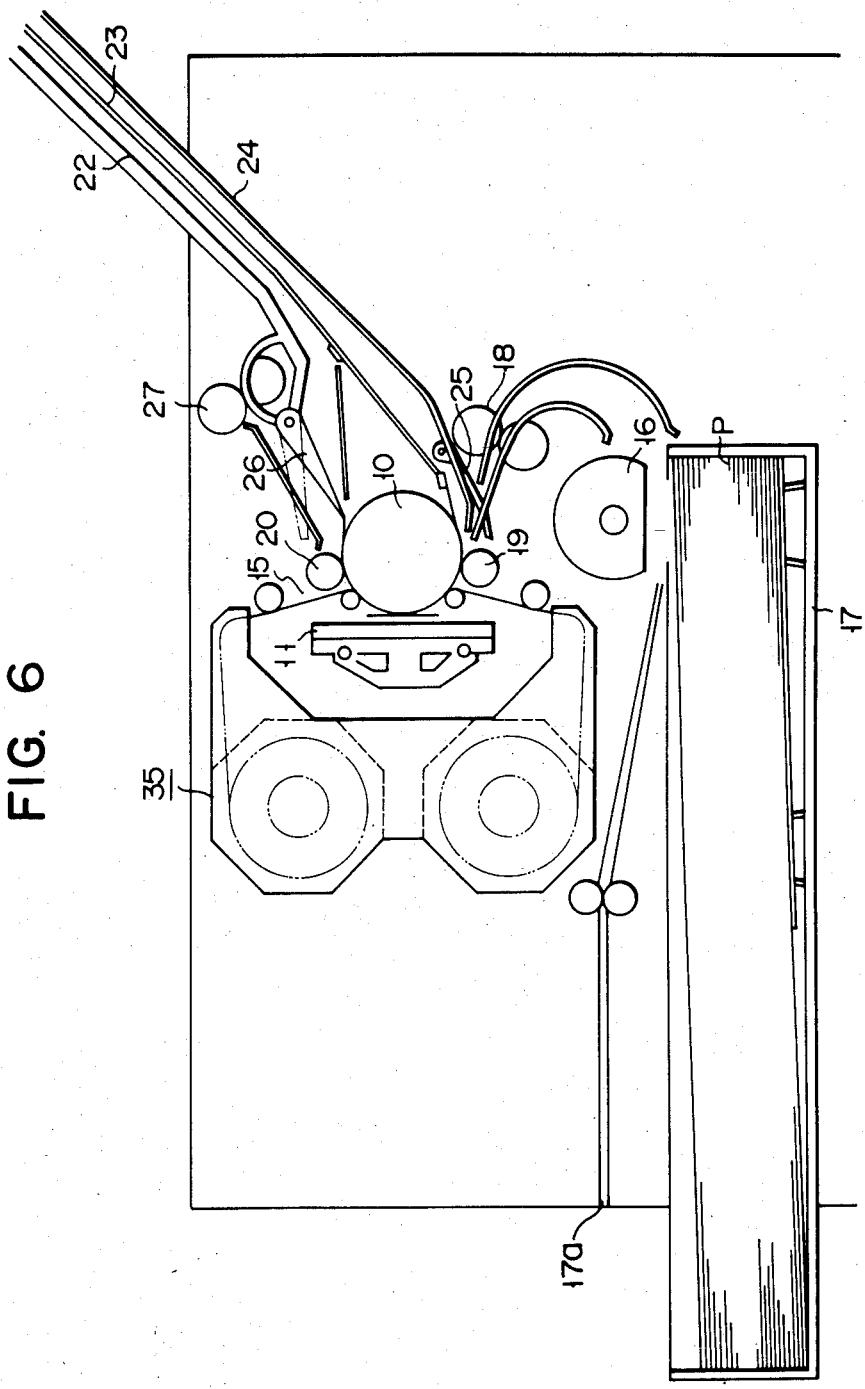
FIG. 6 is a sectional view of an image forming unit of the first embodiment.

The image forming unit has the construction, for example, as shown in FIGS. 2 and 6. A platen 10 is disposed at a substantially central portion of the image forming unit. A thermal head 11 is disposed at the left side of the platen 10 and opposite thereto.

Furthermore, a thermal transfer ribbon (ink ribbon) 15 in a ribbon cassette 35 is arranged between the thermal head 11 and the platen 10. A paper sheet P is brought into tight contact with the platen 10 in the state where the thermal head 11 and the platen 10 have the ink ribbon 15 therebetween. The ink on the ink ribbon 15 is heated and melted by the heat of heating elements (not shown) corresponding to the image signal. Then, the melted ink is transferred to the paper sheet P.

A paper feed roller 16 is provided at the lower right side of the platen 10. The paper feed roller 16 picks up the paper sheets P one by one from the paper feed cassette 17. Leading-end alignment of the picked up paper sheet P is performed by a pair of aligning rollers 18 arranged at the upper right side of the paper feed roller 16. Thereafter, the paper sheet P is conveyed toward the platen 10 until the leading end of the paper sheet P is wound around the platen 10.

Figure 7:
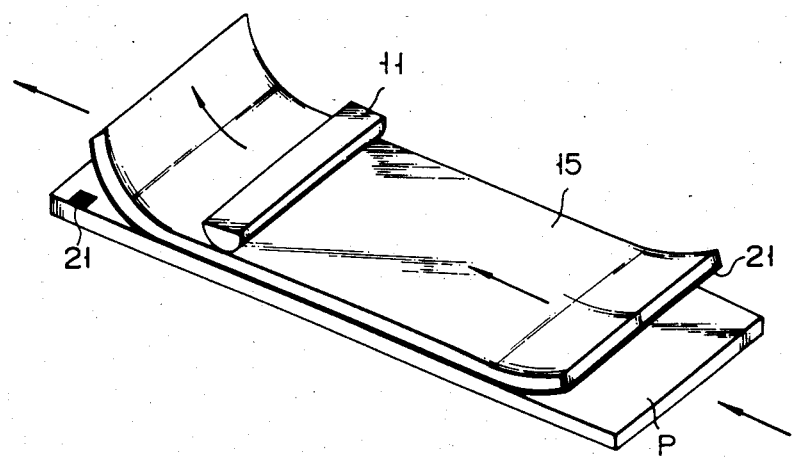
FIG. 7 is a view for explaining the principle of forming an image by the image forming unit.

In this state, the thermal head 11 presses the paper sheet P to the platen 10 through the ink ribbon 15. Then, as shown in FIG. 7, an ink 21 is heated and melted to be transferred onto the paper sheet P.

Figure 8:
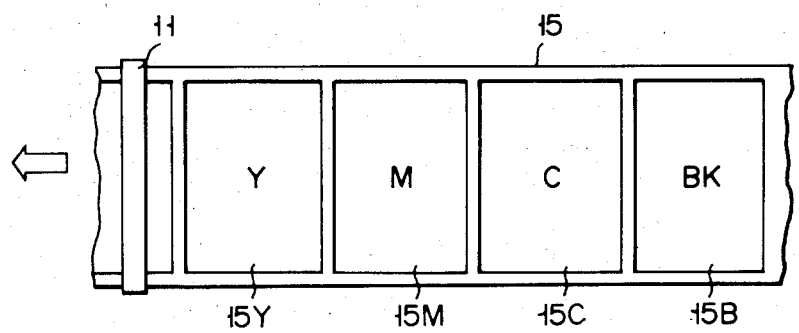
FIG. 8 is a plan view of an ink ribbon of the image forming unit.

Respective ink portions 15Y, 15M, 15C and 15B of yellow, magenta, cyan and black inks having substantially the same length as the paper sheet P are repeatedly arranged on the ink ribbon 15, as shown in FIG. 8. In this case, since black can be obtained by overlapping the yellow, magenta, and cyan inks, the black ink portion 15B can be omitted. An image is transferred onto the paper sheet P by every color component. The paper sheet P is returned when one color component is transferred, and other inks are sequentially transferred to obtain a full color image.

In this manner, the paper sheet P is reciprocated by the number of times corresponding to the number of colors. In this case, the paper sheet P is conveyed along guide plates 23 and 24 sequentially provided along the lower surface of the discharging tray 22.

Figure 9:
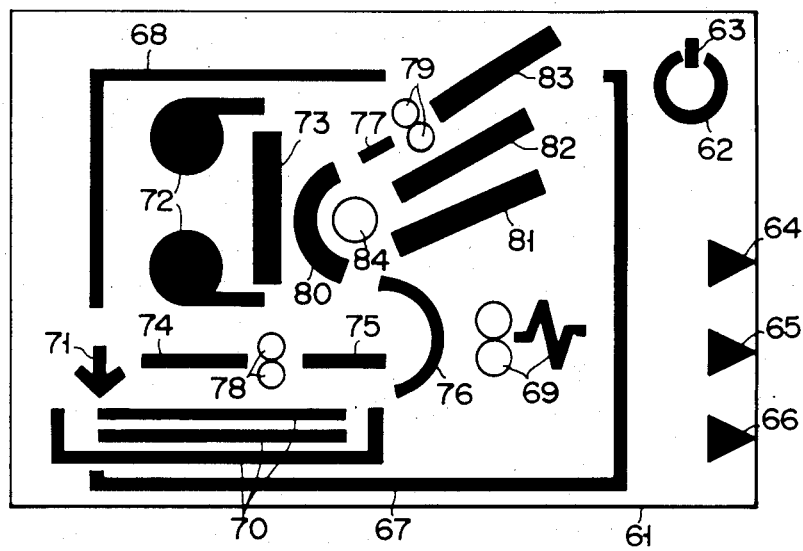
FIG. 9 is a plan view showing a pattern display unit of the operation panel shown in FIG. 3.

The pattern display unit 8 of the operation panel has LCD elements on which respective segments, which form schematical graphic representations of the copying machine components, are provided. Referring to FIG. 9, reference numeral 61 denotes an LCD panel, and reference numerals 62 and 63 denote segments for representing whether the copying operation can be performed or not. When the segment 62 is illuminated, the copying operation can be performed, and when both the segments 62 and 63 are illuminated, the copying operation cannot be performed. Reference numeral 64 denotes a segment for representing that a B5 size paper sheet is selected, reference numeral 65 denotes a segment for representing that a B4 size paper sheet is selected, and reference numeral 66 denotes a segment for representing that an A4 size paper sheet is selected. Reference numerals 67 and 68 denote segments for representing frames of the main body 1, reference numeral 69 denotes a segment for representing that a paper jam has occured, reference numeral 70 denotes segments for representing the paper feed cassette for storing paper sheets, and reference numeral 71 denotes a segment for representing that there is no paper in the paper feed cassette. Reference numeral 72 denotes segments for graphically representing the ribbon cassette, reference numeral 73 denotes a segment for representing the ribbon currently subjected to printing, reference numerals 74 to 77 denote segments for representing convey paths for the paper sheet, reference numeral 78 denotes a segment for representing that a paper jam has occured during the paper-feeding process, reference numeral 79 denotes a segment for representing that a paper jam has occured during the paper-discharging process, reference numerals 80 to 83 denote segments for representing convey and printed color states, and reference numeral 84 denotes a segment for representing the platen.

Figure 10:
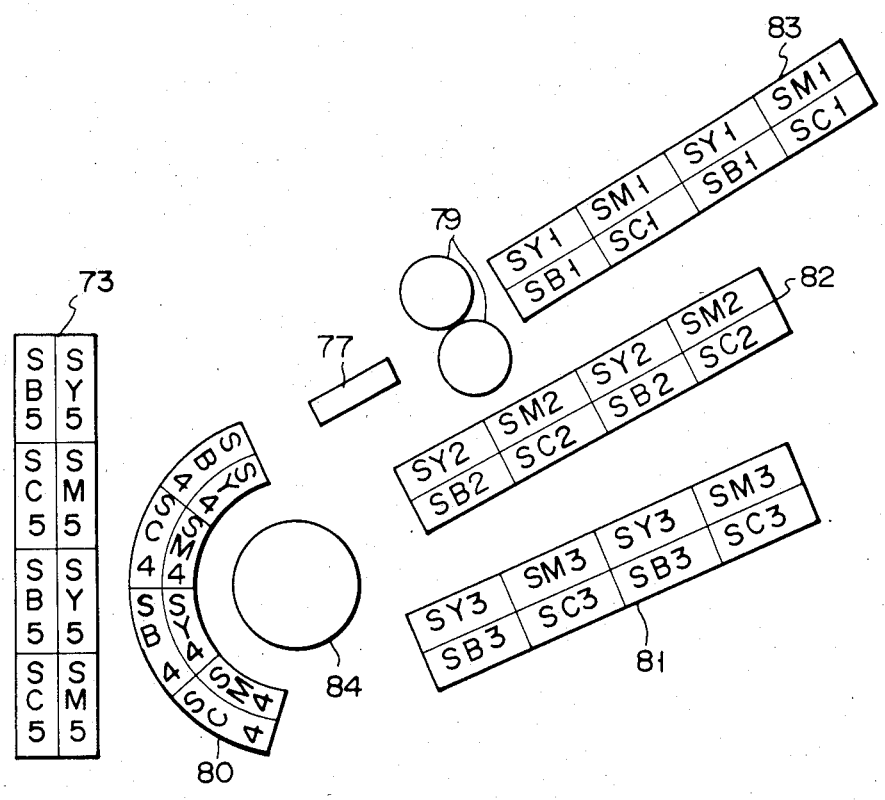
FIG. 10 is a view showing display colors of the pattern display unit of FIG. 9.

The segments 73, 80, 81, 82 and 83 are each divided into eight segments, as shown in FIG. 10. Segments SM1 to SM5, SY1 to SY5, SC1 to SC5, and SB1 to SB5 respectively represent magenta, yellow, cyan and black. The segments 73 represents respective colors of the ink ribbon, the segment 80 represents a printing color, and the segments 81, 82 and 83 represent respective printed colors.

Figure 11:
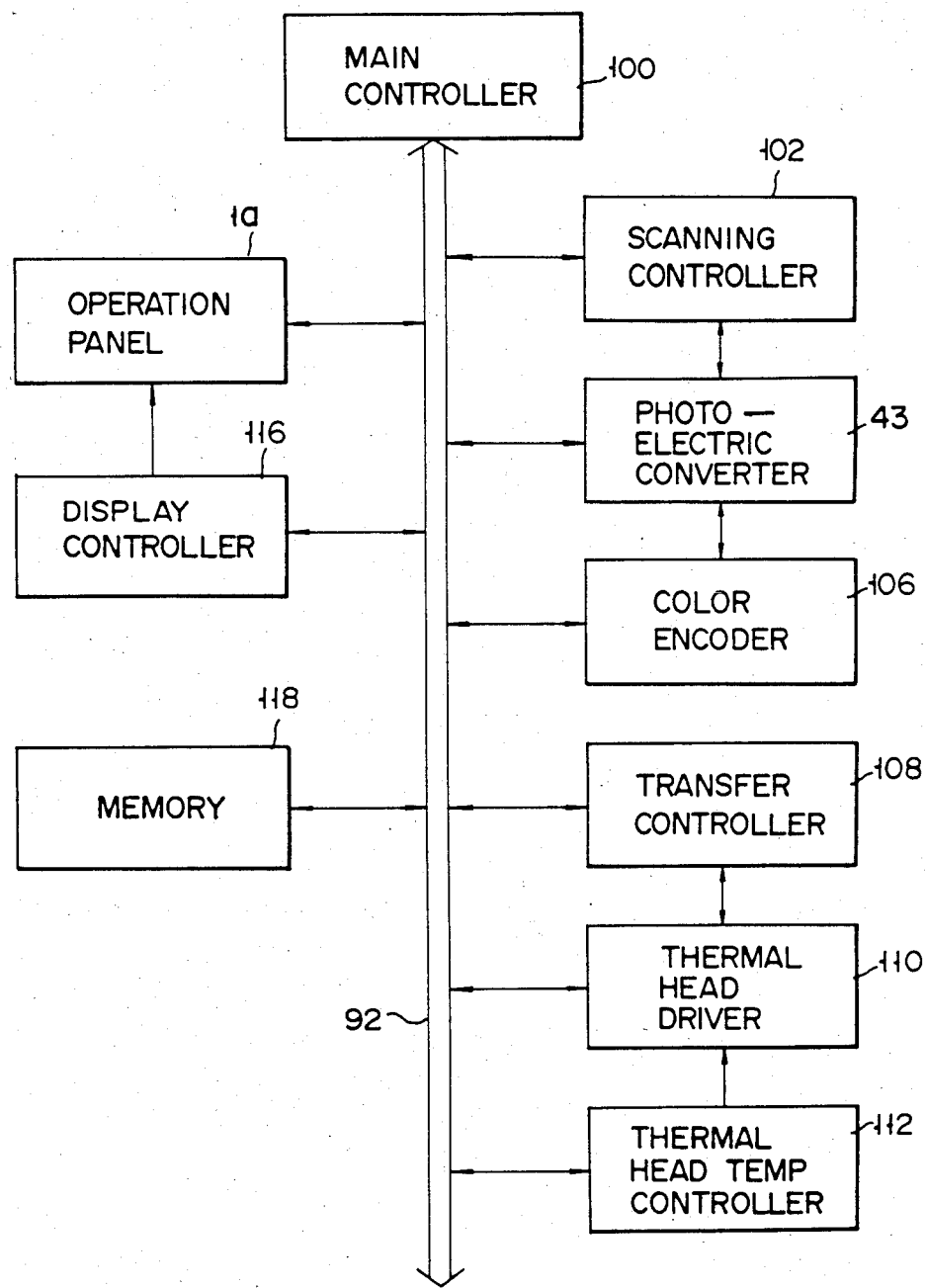
FIG. 11 is a block diagram of a control circuit of the first embodiment.

FIG. 11 schematically shows a control circuit. A main controller 100 controls the overall copying machine and mainly consists of, e.g., a central processing unit (CPU) and its peripheral circuits. A bus line 92 is connected to the main controller 100. The operation panel 1a, a scanning controller 102, the photoelectric converter 43, a color encoder 106, a transfer controller 108, a thermal head driver 110, a thermal head temperature controller 112, a display controller 116 and a memory 118 are respectively connected to the bus line 92. The scanning controller 102 is operated in accordance with a signal supplied from the main controller 100 through the bus line 92, thereby controlling the exposure lamp 42 of the scanner 41, the photoelectric converter 43 and the scanning motor 48. The photoelectric converter 43 detects an image on the document D in response to a signal supplied from the main controller 100 through the bus line 92, thereby generating the image signals of the respective color components of green, yellow and cyan, as described above. The color encoder 106 receives and processes the color signals generated from the photoelectric converter 43. Then, the encoder 106 color-converts the color signals into color signals of yellow, magenta, cyan and black which is the color components of the ink ribbon 15. The color signals are supplied to the bus line 92. The color encoder 106 may perform the color conversion of signals from the bus line 92 so that this circuit can be applied not only to a copying machine, but also to a printer. The transfer controller 108 is operated in accordance with a signal supplied from the main controller 100 through the bus line 92, thereby controlling a motor for driving the platen 10, a motor for driving a reel shaft of the ribbon cassette 35, motors for driving the paper feed roller 16, the aligning rollers 18, a discharging roller 27 and the like, and solenoids (not shown) for driving first and second distributing gates 25 and 26. The thermal head driver 110 is operated in correspondence with the signals supplied from the main controller 100 and the thermal head temperature controller 112, thereby controlling the heating elements of the thermal head 11. The thermal head temperature controller 112 generates a temperature control signal to the thermal head driver 110 in correspondence with a signal supplied from the main controller 100 through the bus line 92. The display controller 116 illuminates the graphical representations on the pattern display unit 8 in correspondence with a signal supplied from the main controller 100 through the bus line 92. The memory 118 is operated in correspondence with a signal supplied from the main controller 100 through the bus line 92, thereby storing the image signal supplied through the bus line 92 and reading out the stored signal. The memory 118 has four areas. For example, the signal of the yellow, magenta, cyan and black components of one page of the document can be respectively stored in the first, second, third, and fourth areas.

Figure 12:
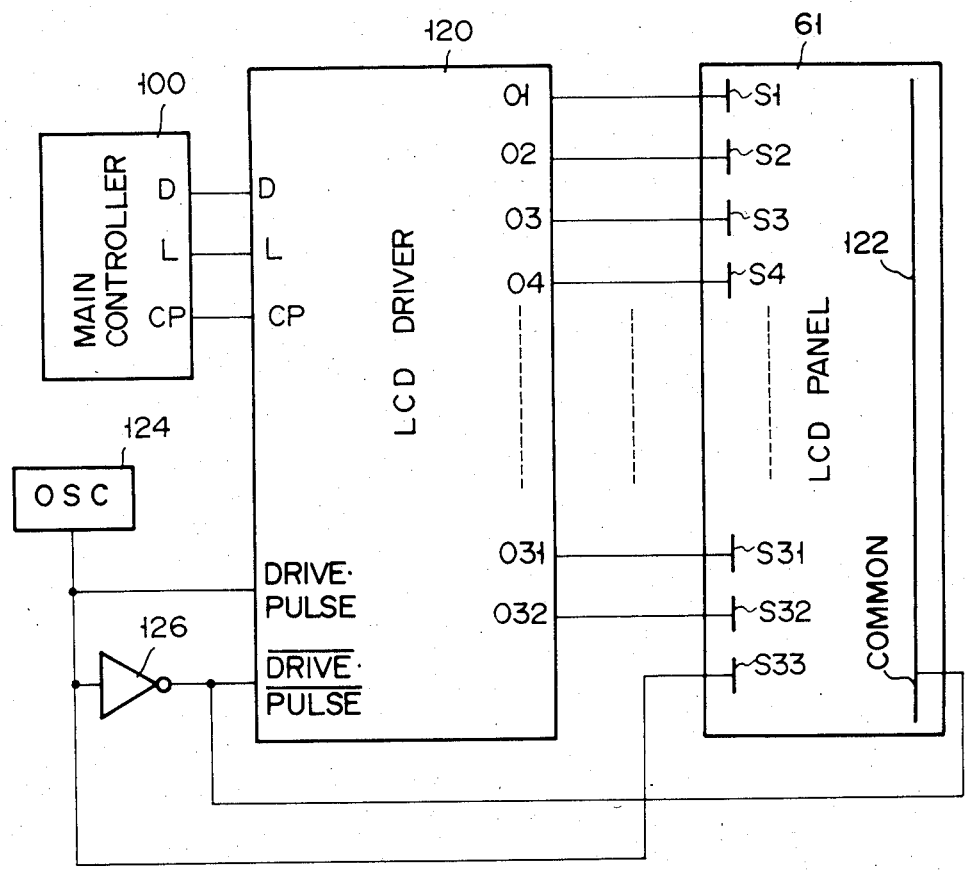
FIG. 12 is a detailed circuit diagram of a display controller shown in FIG. 11.

FIG. 12 shows a configuration of the display controller 116. In FIG. 12, the main controller 100 controls the copying machine and simultaneously outputs the operating state that the copying machine is in, represented by a binary data signal, from an output terminal D. Reference numeral 120 denotes an LCD driver, and a data signal from the main controller 100 is supplied to an input terminal D thereof in synchronism with a clock signal at an input terminal Cp. An oscillator 124 oscillates at an appropriate frequency for driving a liquid crystal display. A DRIVE-PULSE signal generated from the oscillator 124 and a $\overline{\text{DRIVE-PULSE}}$ signal inverted by an inverter 126 are supplied to the LCD driver 120. Then, output signals from output terminals O1 to O32 of the LCD driver 120 are respectively supplied to corresponding LCD elements S1 to S32 provided in the LCD panel 61. The output signal of the oscillator 124, i.e., the DRIVE-PULSE signal is supplied to a LCD element S33. The output signal of the inverter 126, i.e., the $\overline{\text{DRIVE-PULSE}}$ signal is supplied to a common electrode 122 which is provided opposite to the LCD elements S1 to S33 in the LCD panel 61.

Figure 13:
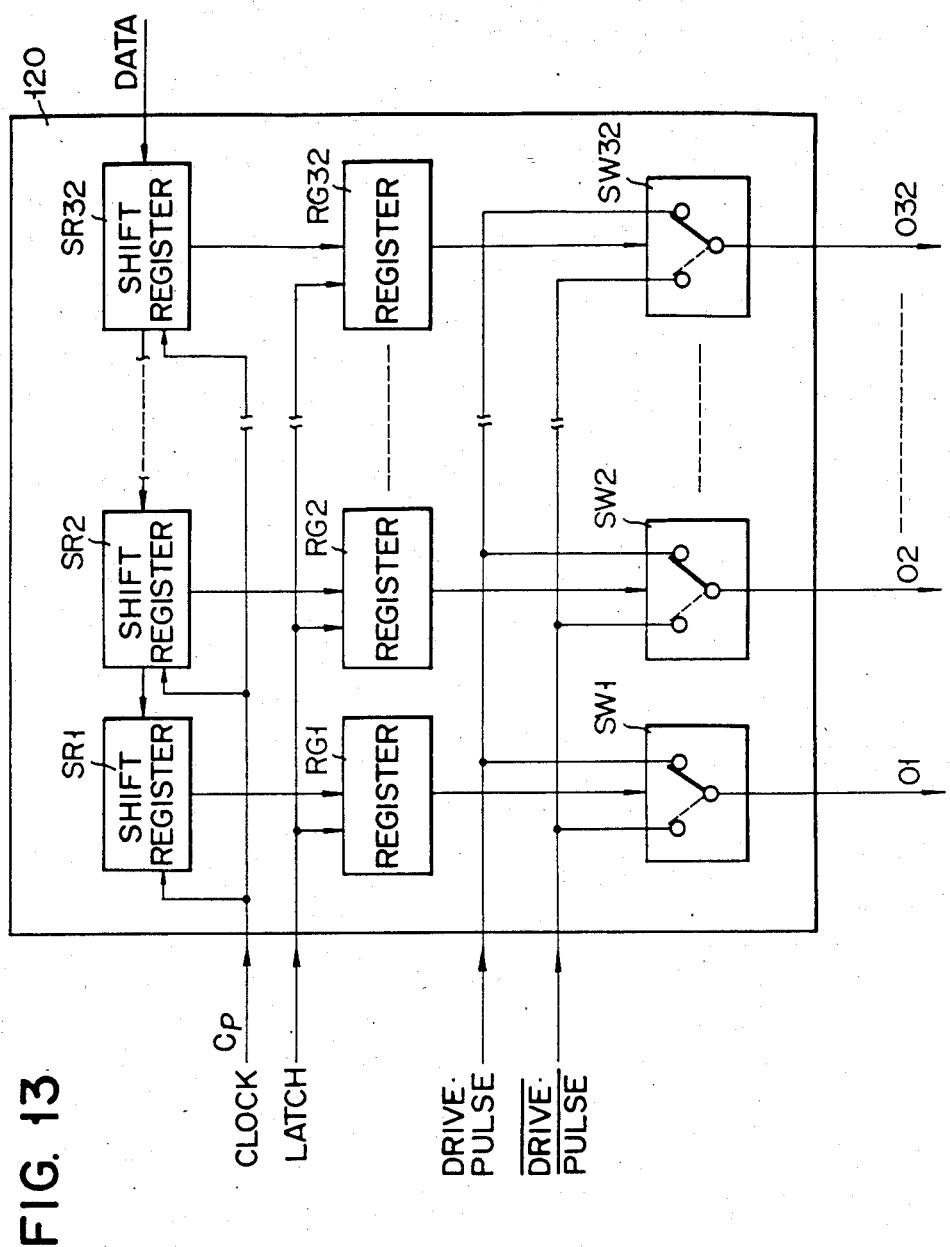
FIG. 13 is a detailed circuit diagram of a liquid crystal display (LCD) driver shown in FIG. 12.

FIG. 13 is a block diagram showing a configuration of the LCD driver 120. The data signal supplied from the input terminal D is sequentially supplied to thirty-two shift registers SR32 to SR1 in synchronism with the clock signal at the input terminal Cp. The shift registers SR1 to SR32 are directly and respectively coupled to registers RG1 to RG32 which hold the contents of the respective shift registers. The registers RG1 to RG32 respectively control switches SW1 to SW32 in accordance with the respective contents held therein so as to supply the DRIVE-PULSE or $\overline{\text{DRIVE-PULSE}}$ signal to the output terminals O1 to O32. When the contents of the registers RG1 to RG32 are "1", the DRIVE-PULSE signal is generated at the corresponding output terminals. Alternatively, when the contents thereof are "0", the $\overline{\text{DRIVE-PULSE}}$ signal is generated. The shift registers SR1 to SR32 respectively correspond to the registers RG1 to RG32 and the switches SW1 to SW32.

The following table shows the data of the respective registers RG1 to RG32 in the LCD driver 120.

TABLE

| Display state | Registers of LCD driver |||||||||||||||| 
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Waiting mode (Copying is disabled) | 1 | 0 | 0 | 0 | 0 | 0 | 0 | 0 | 0 | 0 | 0 | 1 | 1 | 0 | 0 | 0 |
| Waiting mode (Copying is enabled) | 0 | 0 | 0 | 0 | 0 | 0 | 0 | 0 | 0 | 0 | 0 | 0 | 1 | 0 | 0 | 0 |
| No paper | 1 | 1 | 0 | 1 | 0 | 0 | 0 | 0 | 0 | 0 | 0 | 0 | 1 | 0 | 0 | 0 |
| Jamming at paper feed port | 1 | 0 | 1 | 0 | 1 | 0 | 0 | 0 | 0 | 0 | 0 | 0 | 0 | 0 | 0 | 0 |
| Key counter set | 1 | 1 | 0 | 0 | 0 | 0 | 0 | 0 | 0 | 0 | 0 | 1 | 0 | 0 | 0 | 0 |
| No ink ribbon | 1 | 1 | 0 | 0 | 0 | 0 | 0 | 1 | 0 | 0 | 0 | 0 | 1 | 0 | 0 | 0 |
| Serviceman call | 0 | 0 | 0 | 0 | 0 | 0 | 0 | 0 | 0 | 1 | 0 | 0 | 0 | 0 | 0 | 0 |
| Separation error | 1 | 0 | 1 | 0 | 0 | 0 | 0 | 0 | 1 | 0 | 0 | 0 | 0 | 0 | 0 | 0 |
| Jamming at paper discharging | 1 | 0 | 1 | 0 | 0 | 1 | 0 | 0 | 0 | 0 | 0 | 0 | 0 | 0 | 0 | 0 |

| Display state | Registers of LCD driver |||||||||||||||| 
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Waiting mode (Copying is disabled) | 0 | 0 | 0 | 1 | 0 | 0 | 0 | 1 | 1 | 1 | 0 | 0 | 0 | 0 | 0 | 0 |
| Waiting mode (Copying is enabled) | 0 | 0 | 0 | 1 | 1 | 0 | 0 | 0 | 0 | 0 | 0 | 0 | 0 | 0 | 0 | 0 |
| No paper | 0 | 0 | 1 | 1 | 1 | 1 | 1 | 1 | 1 | 0 | 0 | 0 | 0 | 0 | 0 | 0 |
| Jamming at paper feed port | 0 | 0 | 1 | 0 | 1 | 1 | 1 | 1 | 1 | 0 | 0 | 0 | 0 | 0 | 0 | 0 |
| Key counter set | 0 | 0 | 1 | 1 | 1 | 1 | 1 | 1 | 1 | 1 | 1 | 1 | 1 | 1 | 1 | 1 |
| No ink ribbon | 0 | 0 | 1 | 1 | 1 | 1 | 1 | 1 | 1 | 1 | 1 | 1 | 1 | 1 | 1 | 1 |

TABLE-continued

| | | | | | | | | | | | | | | | | |
|---|---|---|---|---|---|---|---|---|---|---|---|---|---|---|---|---|
| Serviceman call | 0 | 0 | 1 | 1 | 1 | 1 | 1 | 1 | 1 | 1 | 1 | 1 | 1 | 1 | 1 | 1 |
| Separation error | 0 | 0 | 1 | 1 | 1 | 1 | 1 | 1 | 1 | 1 | 1 | 1 | 1 | 1 | 1 | 1 |
| Jamming at paper discharging | 0 | 0 | 1 | 1 | 1 | 1 | 1 | 1 | 1 | 1 | 1 | 1 | 1 | 1 | 1 | 1 |

The operation of the display controller 116 during the "Waiting mode" (copying is disabled) will now be described as an example of this embodiment. As shown in FIG. 14A, when a power supply switch (not shown) is turned on at time $t_0$, the main controller 100 starts operation according to a preset program. Then, a paper feed command is generated and a data signal (FIG. 14B) which represents the waiting mode (copying is disabled) (i.e., 1000000000011000000100011000000 of the uppermost column of the table, which is referred to as a wait signal hereinafter) is generated in synchronism with the clock signal (FIG. 14C) from the terminal Cp. When the main controller generates the last, 32nd data pulse, it generates the latch signal shown in FIG. 14D. As a result, the data "1" is set in the registers RG1, RG12, RG13, RG20, RG24, RG25 and RG26 and the data "0" is set at the other registers.

Figure 17A:
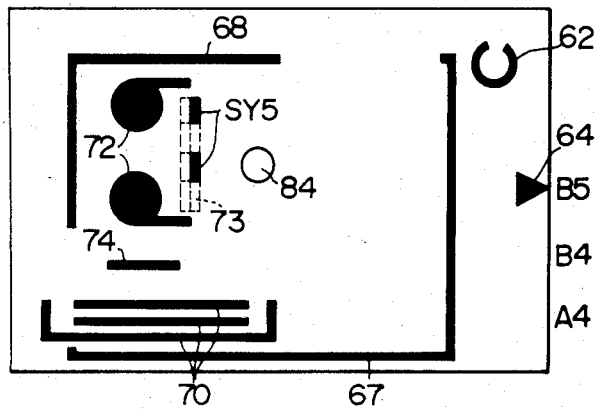
FIGS. 17A to 17Q are plan views showing display states of the pattern display unit of the operation panel during an image forming process.

For this reason, the DRIVE PULSE signal (FIG. 15A) is supplied to the LCD elements S1, S12, S13, S20 and S24 to S26, as shown in FIG. 15D, and the $\overline{\text{DRIVE PULSE}}$ signal (FIG. 15B) is applied to the other LCD elements, as shown in FIG. 15E. The $\overline{\text{DRIVE PULSE}}$ signal is also supplied to the common electrode 122, as shown in FIG. 15C. As a result, a voltage having an AC waveform is applied between the LCD elements S1, S12, S13, S20 and S24 to S26, and the common electrode 122, as shown in FIG. 15F. Then, the corresponding segments which form graphical representations are illuminated. Alternatively, the potential difference between the other LCD elements and the common electrode 122 becomes zero, and the corresponding graphic segments are therefore not illuminated, as shown in FIG. 15G. The illuminated LCD elements S1, S12, S13, S20 and S24 to S26 correspond to the graphical representation displaying segments 62 and 63, the paper size displaying segment 64, the frame displaying segments 67 and 68, the paper feed cassette displaying segment 70, the ribbon cassette displaying segment 72, the segments SY5 for representing that the color of the ink ribbon 15 is yellow, the convey path displaying segment 74, and the platen displaying segment 84 shown in FIG. 9. When the mode is turned into the waiting mode (copying is enabled), the segment 63 is turned off. The displaying state in this case is shown in FIG. 17A.

Figure 16A:
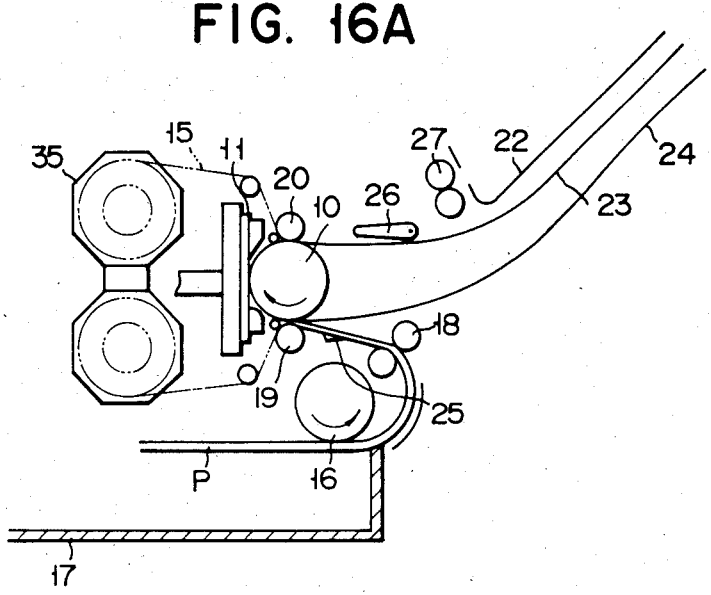
FIGS. 16A to 16D are views sequentially showing an image forming process.

The copying operation of this embodiment will now be described with reference to the changes in the display pattern of the pattern display unit 8. During the waiting mode (copying is enabled), when the document D is placed on the document table 4 and the start key 2 is depressed, the copying operation is started. First, the scanner 41 is moved to initiate the scanning of the document. The image signal read by the scanner 41 is color-converted by the color encoder 106, i.e., the signal is separated into a yellow component, a magenta component, a cyan component, and a black component. This color separation is performed for the signal of every one scanning line. The signal of the respective color components for every one scanning line is stored in the memory 118. Accordingly, the yellow, magenta, cyan and black component signals are respectively stored in the first, second, third and fourth areas of the memory 118. In this manner, when the signals of one page of the document are stored, the paper sheet P which is stored in the paper feed cassette 17 is picked up by the paper feed roller 16. The picked-up paper sheet P is conveyed to the aligning rollers 18 in which leading end alignment thereof is performed. Thereafter, the paper sheet P is conveyed to the platen 10 by the aligning rollers 18, passing the distributing gate 25, and the leading end thereof is wound around the platen 10 by the press rollers 19 and 20 (FIG. 16A).

Figure 17B:
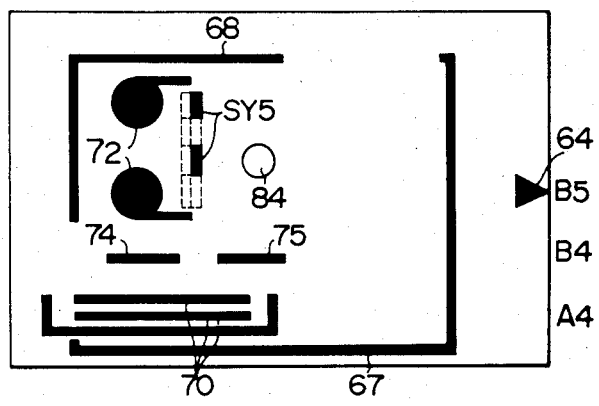
Figure 17C:
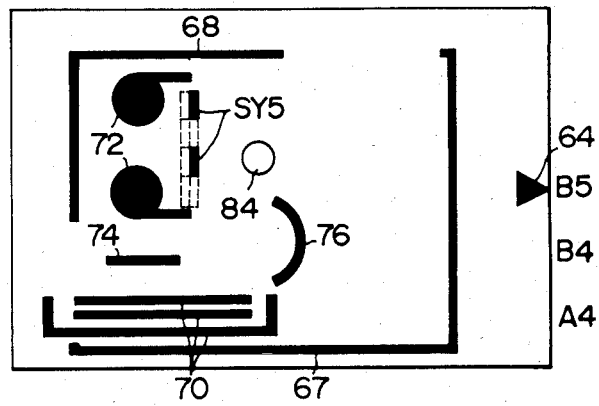

In this case, the pattern display unit 8 does not illuminate the segment 62 but illuminates the convey path displaying segment 76 as compared with the display state of the waiting mode (copying is enabled), as shown in FIG. 17C. When the paper sheet P is manually fed, the convey path displaying segment 75 is turned on as compared with the case of the display state of the waiting mode (copying is enabled), as shown in FIG. 17B. This graphic representation represents that the paper sheet P is under convey.

Then, the paper sheet P is conveyed by the platen 10 and the image of the yellow component of one page of the document is thermally transferred thereto using the yellow ink portion 15Y of the ink ribbon 15. In this case, the pattern display unit 8 turns off the convey path display segment 76 and illuminates the segments SY4 and SY5 which represent that the printing color is yellow, thereby representing that yellow is undergoing printing, as shown in FIG. 17D.

Figure 16B:
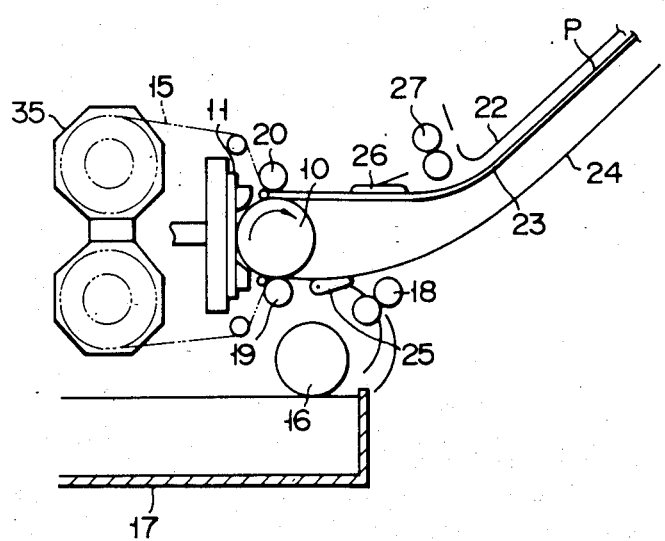

In this manner, the paper sheet P having the yellow image thereon is conveyed onto the first guide plate 23 by the rotation of the platen 10 and the distributing gate 26, as shown in FIG. 16B. In this case, the pattern display unit 8 does not illuminate the segment SY4 but illuminates the segment SY2, thereby displaying, by means of graphic representation, that the yellow printing is finished, as shown in FIG. 17E.

Figure 16C:
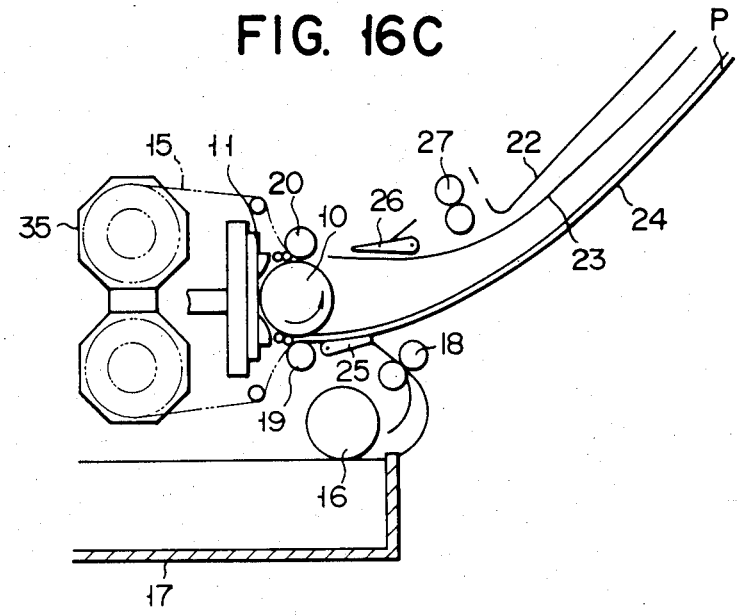
Figure 17G:
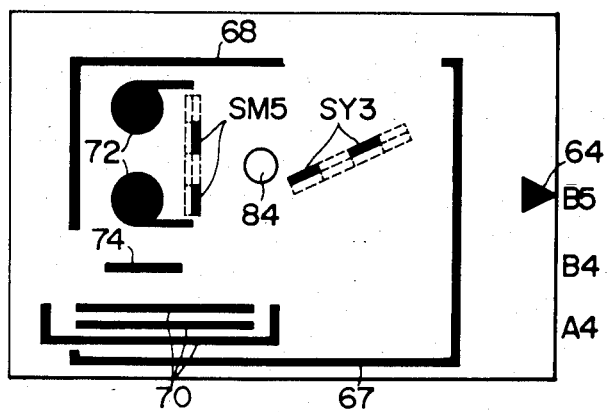

Next, the paper sheet P is conveyed in the reverse direction by the reverse rotation of the platen 10. In this case, the pattern display unit 8 does not illuminate the segment SY2 but illuminates the segment SY4, thereby representing, by graphic representation, that the paper sheet P is under reverse-convey, as shown in FIG. 17F. After the paper sheet P is conveyed in the reverse direction, it is placed on the second guide plate 24 through the distributing gate 25, as shown in FIG. 16C. In this case, the pattern display unit 8 does not illuminate the segments SY4 and SY5 but illuminates the segment SM5 which represents that the magenta portion of the ink ribbon 15 is being used and the segment SY3 which represents the printed color state, thereby representing that the yellow-printed paper sheet has been conveyed to the transfer starting position and that the next printing color is magenta by graphic representation, as shown in FIG. 17G.

Figure 17H:
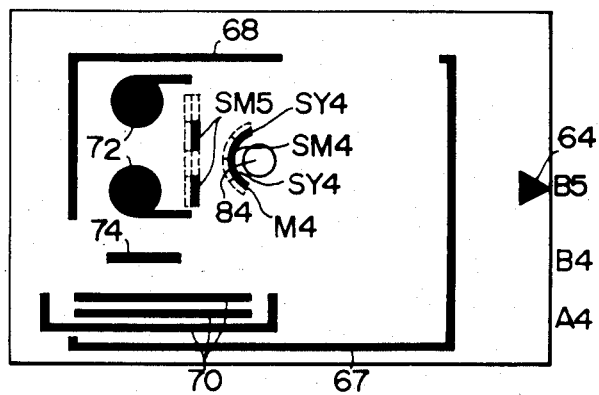

The paper sheet P is conveyed by the platen 10, and the image of the magenta commponent of one page of the document read out from the memory 118 is transferred thereto by the thermal head 11 using the magenta ink portion 15M of the ink ribbon 15. The pattern display unit 8 does not illuminate the segment SY3 but illuminates the segments SY4 and SM4 which represent the respective printed state, thereby representing, by graphic representation, that magenta is undergoing printing, as shown in FIG. 17H.

Figure 17I:
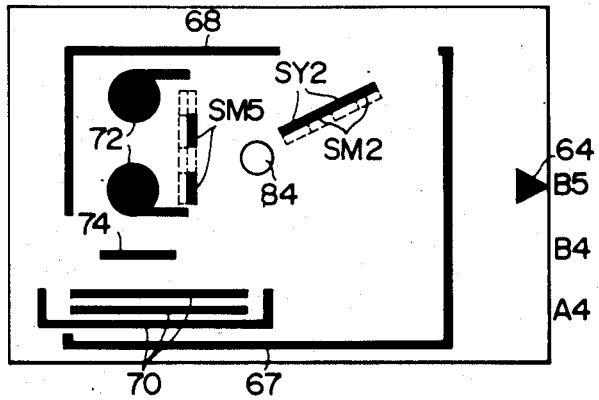

Then, the paper sheet P having the yellow and magenta images thereon is conveyed onto the first guide plate 23 by the rotation of the platen 10 (FIG. 16B). In this case, the pattern display unit 8 does not illuminate the segments SY4 and SM4 but illuminates the segments SY2 and SM2 which represent the printing state, thereby representing, by graphic representation, that printing of the yellow and the magenta is finished, as shown in FIG. 17I.

Figure 17J:
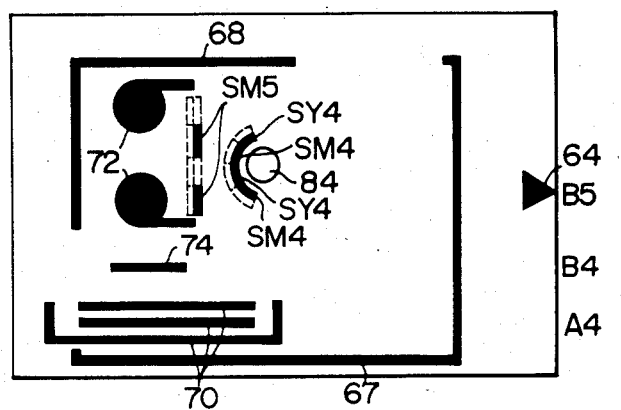

When the platen 10 is rotated in the reverse direction again, the paper sheet P is conveyed in the reverse direction. In this case, the pattern display unit 8 does not illuminate the segments SY2 and SM2 but illuminates the segments SY4 and SM4, thereby representing, by graphic representation, that the paper sheet P having the yellow and magenta image thereon is under reverse-transfer, as shown in FIG. 17J.

Figure 17K:
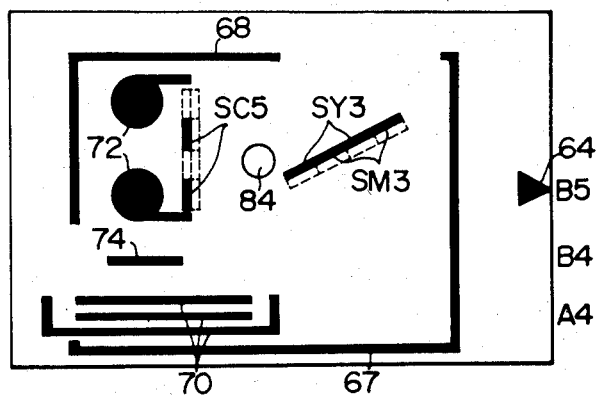

When the paper sheet P is conveyed in the reverse direction, it is placed on the second guide plate 24 (FIG. 16C). In this case, the pattern display unit 8 does not illuminate the segments SY4, SM4 and SM5 but illuminates the segment SC5 which represents that the color of the ink ribbon 15 is cyan, the segments SY3 and SM3 which represent the printed state, thereby representing that the paper sheet P has been conveyed to the transfer state position and that the next printing color is cyan, by graphic representation, as shown in FIG. 17K.

Figure 17L:
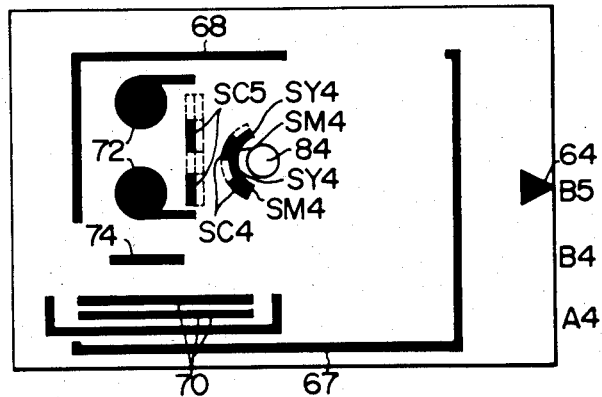

The paper sheet P is then reconveyed by the platen 10. The image signal of the cyan component of one page of the document read out from the memory 118 is thermally transferred to the paper sheet P by the thermal head 11 using the cyan ink portion 15C of the ink ribbon 15. In this case, the pattern display unit 8 does not illuminate the segments SY3 and SM3 but illuminates the segment SY4, SM4 and SC4 which represent the printed state, thereby representing, by graphic representation, that cyan is undergoing printing, as shown in FIG. 17L.

Figure 17M:
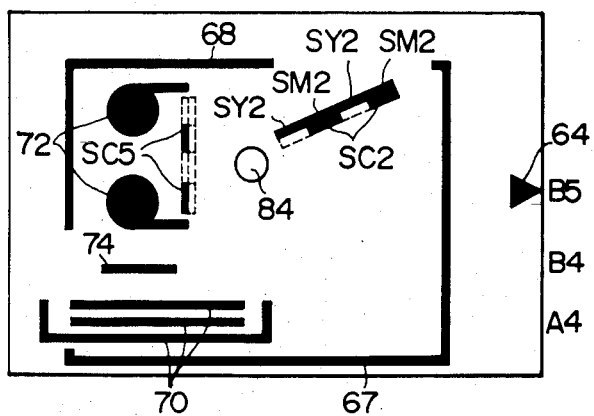

The paper sheet P having the yellow, magenta and cyan images thereon is conveyed onto the first guide plate 23 by the rotation of the platen 10 (FIG. 16B). In this case, the pattern display unit 8 does not illuminate the segments SY4, SM4 and SC4 but illuminates the segments SY2, SM2 and SC2 which represent the printed state, thereby representing, by graphic representation, that printing of yellow, magenta and cyan is finished, as shown in FIG. 17M.

Figure 17N:
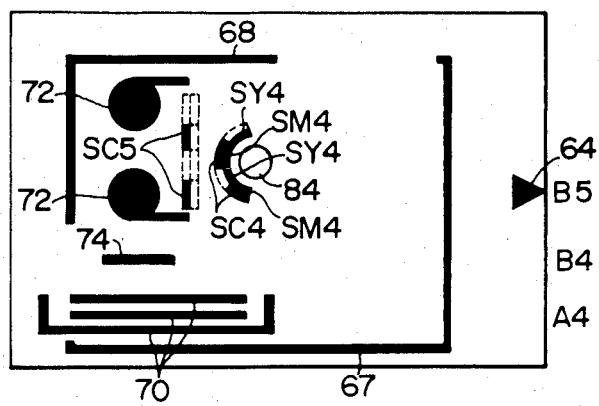
Figure 17O:
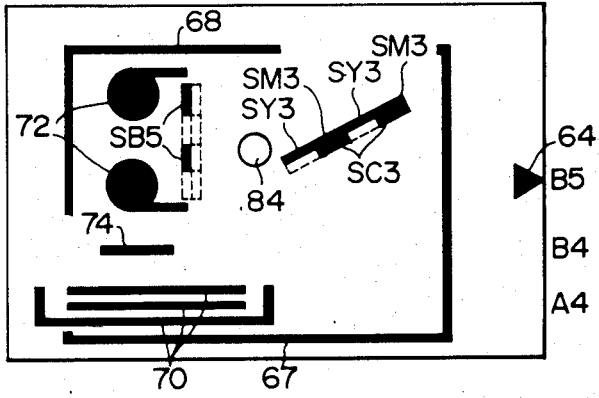

Then, the platen 10 is rotated in the reverse direction so as to convey the paper sheet P in the reverse direction. The pattern display unit 8 does not illuminate the segments SY2, SM2 and SC2 but illuminates the segments SY4, SM4 and SC4, thereby representing that the paper sheet P having the yellow, magenta and cyan images thereon is being conveyed, as shown in FIG. 17N. When the paper sheet P is conveyed in the reverse direction, it is placed on the second guide plate 24 (FIG. 16C). The pattern display unit 8 does not illuminate the segments SY4, SM4, SC4 and SC5 but illuminates the segment SB5 which represents that the color of the ink ribbon 15 is black and the segments SY3, SM3 and SC3 which represent the printed state, thereby representing that the yellow, magenta and cyan printed paper sheet P has been conveyed to the transfer start position and that the next printing color is black, by graphic representation, as shown in FIG. 17O.

Figure 17P:
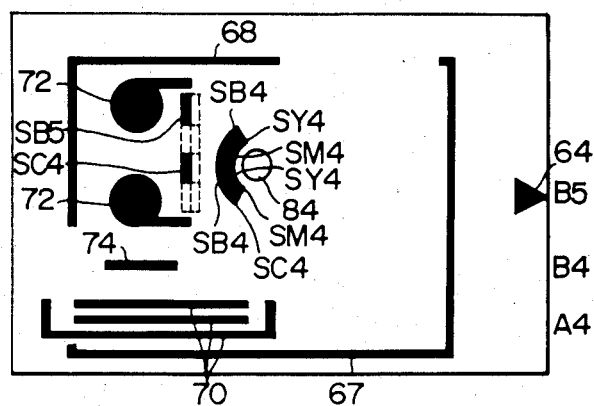

When the paper sheet P is reconveyed by the platen 10, the image signal of the black component of one page of the document read out from the memory 118 is transferred thereto using the black ink portion 15B of the ink ribbon 15. The pattern display unit 8 does not illuminate the segments SY3, SM3 and SC3 but illuminates the segments SY4, SM4, SC4 and SB4 which represent the printed state, thereby representing, by graphic representation, that black is undergoing printing, as shown in FIG. 17P.

Figure 16D:
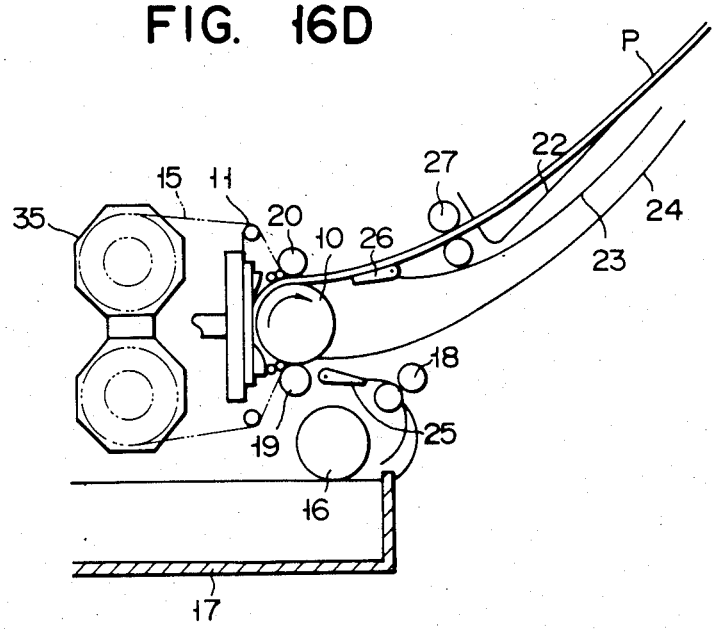
Figure 17Q:
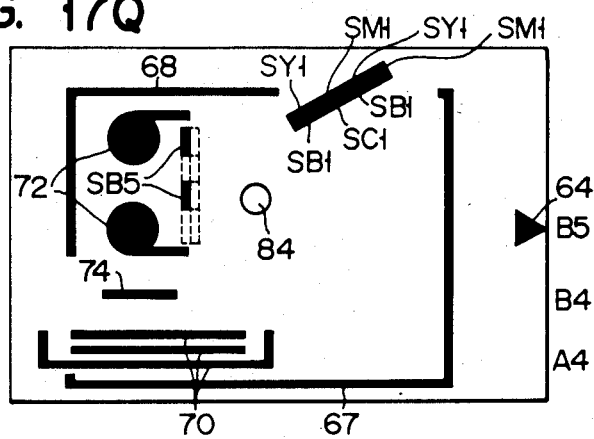

In this manner, the paper sheet P having the yellow, magenta, cyan and black images thereon is guided to the discharging roller 27 by the second distributing gate 26. Then, the paper sheet P is discharged into the discharging tray 22 by the discharging roller 27, as shown in FIG. 16D, and the copying operation is finished. In this case, the pattern display unit 8 does not illuminate the segments SY4, SM4, SC4 and SB4 but illuminates the segments SY1, SM1, SC1 and SB1 which represent the printed state when the sheet P is discharged, thereby representing, by graphic representation, that the all colors have been printed and the paper sheet P is discharged, as shown in FIG. 17Q.

As described above, the printing color, printed color and color to be printed can be represented by graphic representation by means of the pattern display unit 8, thereby letting the operator know the copied state and the processing state. Therefore, the operator can confirm the processing state of the copying operation at a glance.

Figure 18:
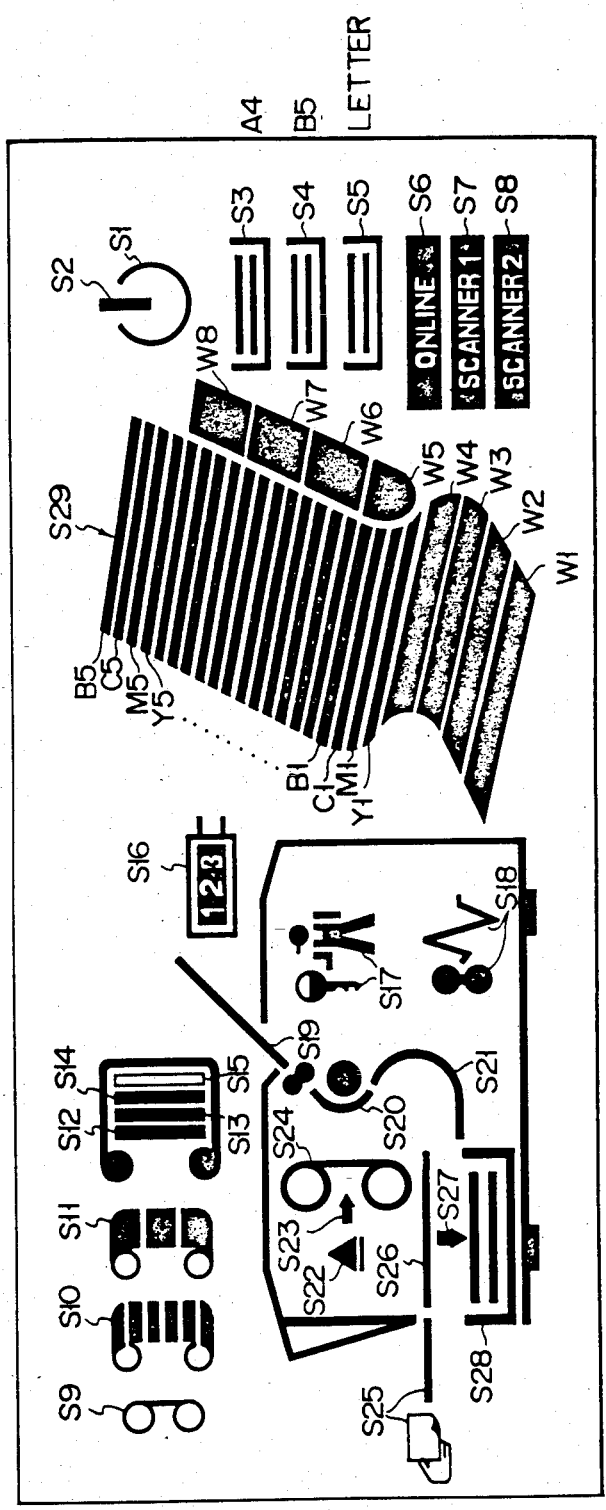
FIG. 18 is a plan view of a pattern display unit of the operation panel according to a second embodiment of the present invention.
Figure 19A:
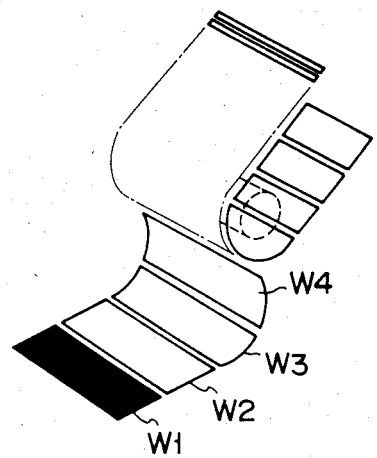
FIGS. 19A to 19D are views showing the image display unit of the operation panel during a paper feed process of the second embodiment.
Figure 19B:
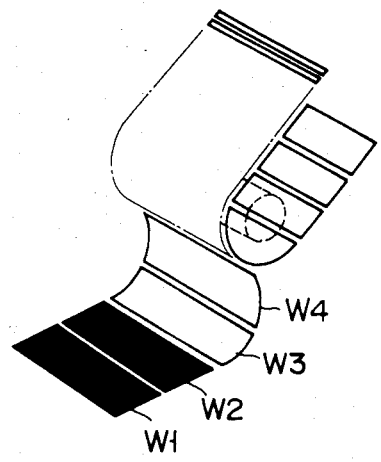
Figure 19C:
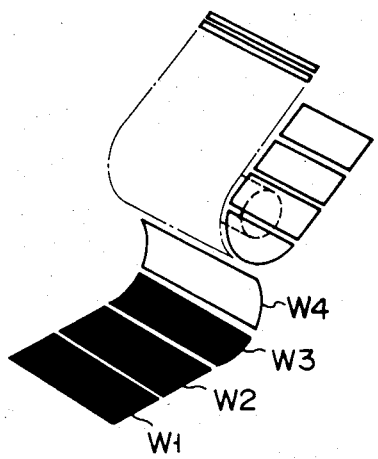
Figure 19D:
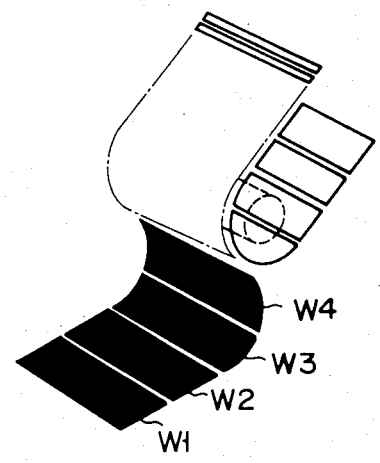
Figure 21A:
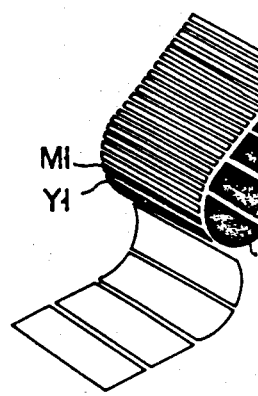
FIGS. 21A to 21I are views showing displaying states of the pattern display unit during the formation of a magenta image of the second embodiment.
Figure 21B:
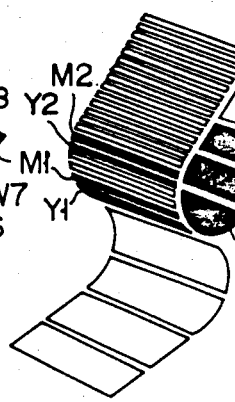
Figure 21C:
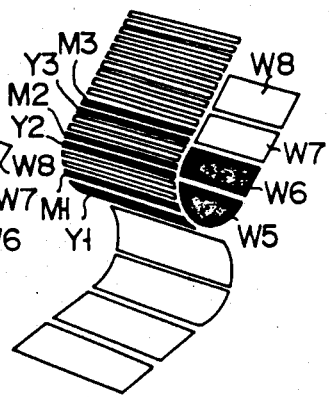
Figure 21D:
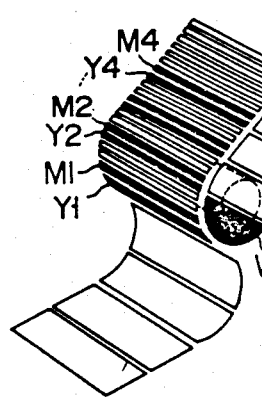
Figure 21E:
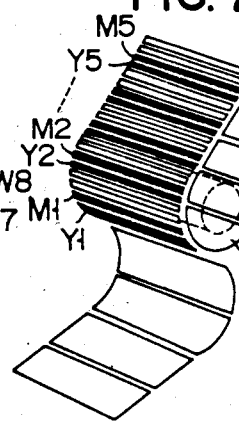
Figure 21F:
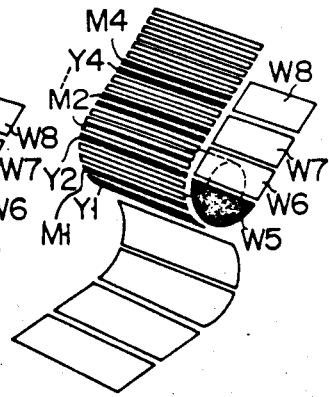
Figure 21G:
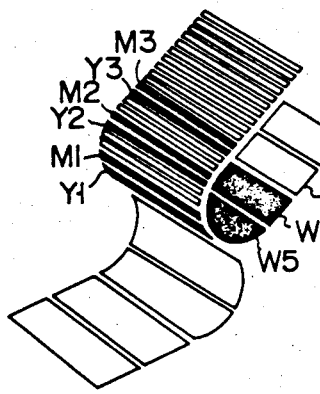
Figure 21H:
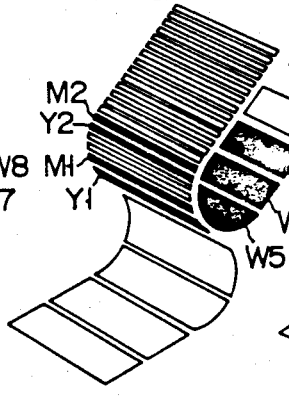
Figure 21I:
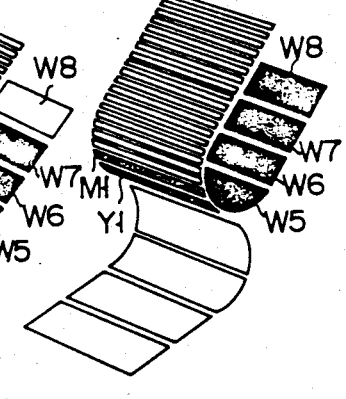
Figure 22A:
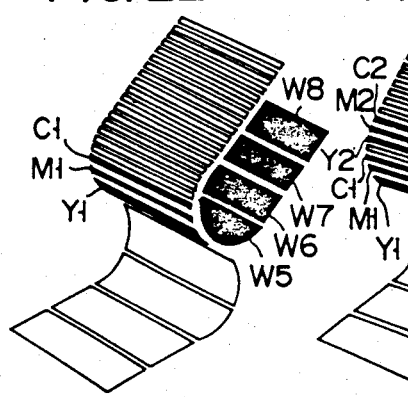
FIGS. 22A to 22I are views showing displaying states of the pattern display unit of the operation panel during the formation of a cyan image of the second embodiment.
Figure 22B:
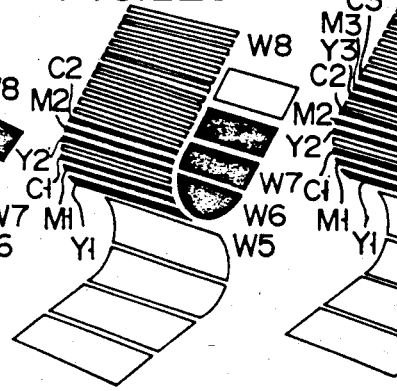
Figure 22C:
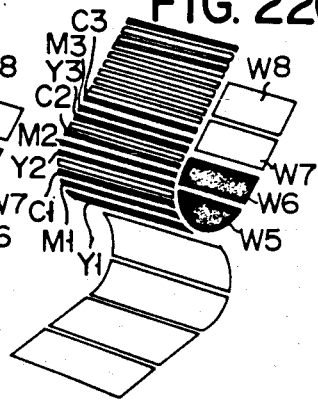
Figure 22D:
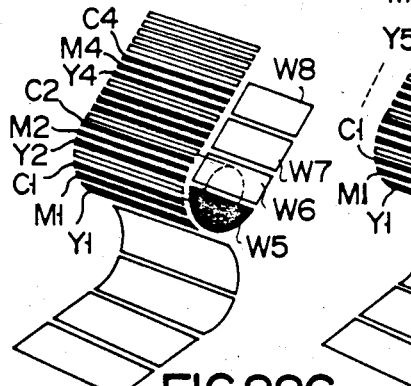
Figure 22E:
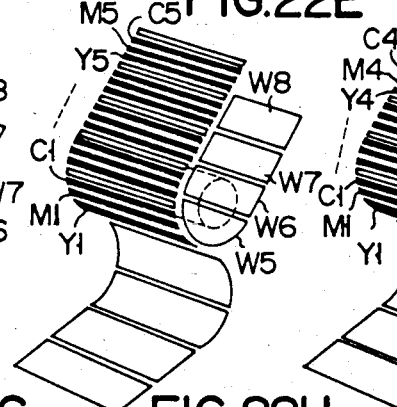
Figure 22F:
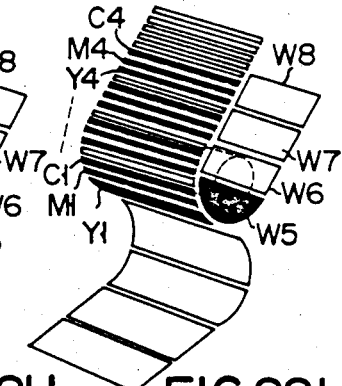
Figure 22G:
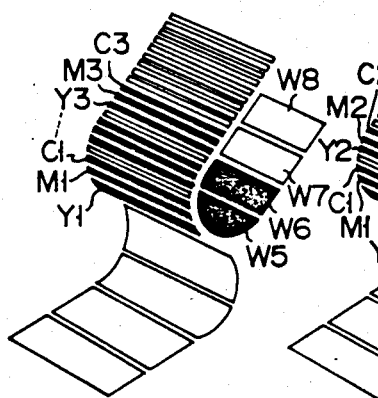
Figure 22H:
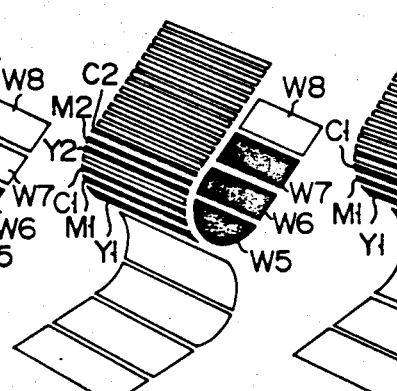
Figure 22I:
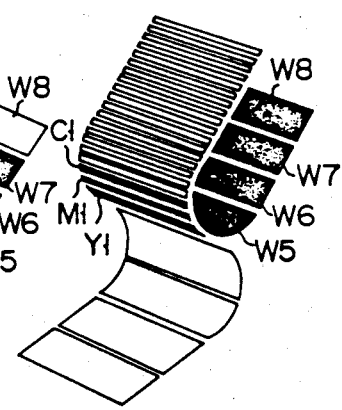
Figures 23A, 23B, 23C:
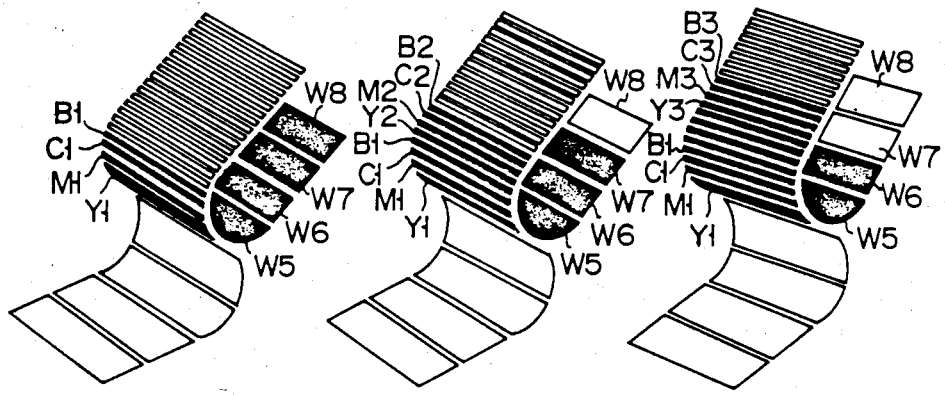
FIGS. 23A to 23E are views showing displaying states of the pattern display unit of the operation panel during the formation of a black image of the second embodiment.
Figures 23D, 23E:
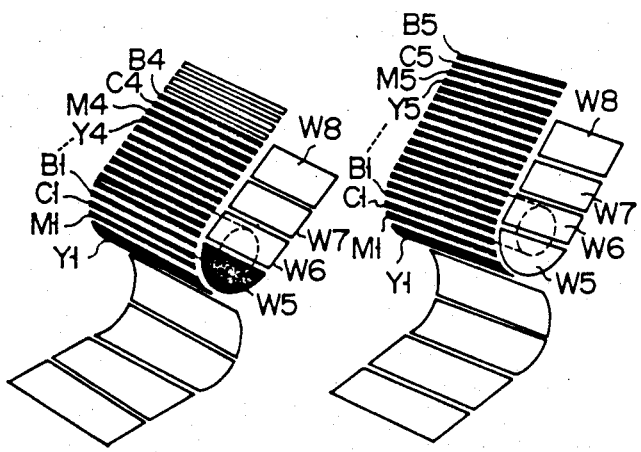

A second embodiment of the present invention will now be described. This second embodiment relates to a modification of the pattern display unit 8 of the operation panel 1a. FIG. 18 shows a pattern display unit 8 of an operation panel 1a. The pattern display unit 8 indicates the conditions of each portion of a main body 1 and FIG. 18 shows the case when all segments are illuminated. Reference symbols S1 and S2 denote LCD elements or segments for graphically representing whether the transfer operation is enabled or not. When only the segment S1 is illuminated, it represents that the transfer operation is enabled. When both the segments S1 and S2 are illuminated, it represents that the transfer operation is disabled (warming-up period). During the transfer operation, the segment S1 is flashed. When segments S3 to S5 are illuminated, they represent respective sizes of paper sheets. The segments S3 to S5 correspond to, e.g., printed letters "A4", "B5" and "LETTER" on the operation panel 1a. When one of the segments S3 to S5 is illuminated, it represents that the corresponding paper size is selected. Segments S6 to S8 represent types of input units such as document scanners. When the segment S6 is illuminated, it represents that the copying machine is coupled to, e.g., a personal computer and the output signal thereof is printed. The segments S7 and S8 represent the selected document scanner. Segments S9 to S15 represent types of ribbon cassettes 35 which are set in the main body 1. The segment S10 represents that the ribbon cassette for small size paper is loaded. The segment S11 represents that the ribbon cassette for large size paper is loaded. The segment S9 represents that the ribbon cassette for other size paper is loaded. Segments S12 to S15 represent color variations of an ink ribbon 15. The segments S12 to S15 are respectively formed of cyan, magenta, yellow and white colored liquid crystal displays. When an ink ribbon for multicolor is used, all the segments S12 to S15 are illuminated. When an ink ribbon for single color (monochrome) is used, only the segment S15 is illuminated. A segment S16 represents the contents of the key-counter. A segment S17 represents that a serviceman should be called. A segment S18 represents that a paper jam has occurred. Segments S19 to S21 represent corresponding positions of a paper jam. Furthermore, a segment S22 is illuminated when the ribbon cassette 35 is taken out. A segment S23 flashes when the ribbon cassette 35 is not loaded and sufficient ink ribbon 15 remains for only one last copying operation or is completely used up. A segment S24 flashes when sufficient ink ribbon 15 remains for two last copying operations, and it is illuminated when the ink ribbon 15 is used up or no ribbon cassette is loaded. Segments S27 and S28 flash when no paper sheets are stored in the paper feed cassette or no paper cassette is loaded. A segment S25 is illuminated when the paper sheet is manually fed. A segment S26 flashes when the manually fed paper sheet is jammed.

On the other hand, a segment S29 sequentially represents the operation state of the paper sheets and the ink ribbon 15. This segment S29 corresponds to multiple color LCD elements and comprises segments W1 to W8 (white), Y1 to Y5 (yellow), M1 to M5 (magenta), C1 to C5 (cyan) and B1 to B5 (black). The white segments W1 to W8 represent the conveying state of the paper sheet. The yellow, magenta, cyan and black segments Y1 to Y5, M1 to M5, C1 to C5 and B1 to B5 represent the transfer state using the ink portions of respective colors. These segments Y1 to Y5, M1 to M5, C1 to C5 and B1 to B5 are cyclically arranged in the order named.

Next, the display operation will be described. When the paper feed roller 16 is driven, the transfer operation is started. Simultaneously, a display instruction signal is supplied to the display controller 116 from the main controller 100. In accordance with this signal, the display controller 116 sequentially illuminates the white segments W1 to W4 in synchronism with the operation timing of the paper feed roller 16, thereby representing the paper feed operation, as shown in FIGS. 19A to 19D.

When the leading end of the paper sheet is conveyed to the printing start position, the transfer operation using the yellow ink is performed, as described above. Simultaneously, the segment S29 is illuminated to represent the yellow-transfer operation. In the main body 1, when the leading end of the paper sheet is moved to the printing start position and the yellow ink portion of the ink ribbon 15 is set at the transfer start position (this operation is referred to as "leading end alignment"), a transfer start instruction signal is supplied to the transfer controller 108, the thermal head driver 110 from the main controller 100. Simultaneously, a display instruction signal is supplied to the display controller 116. The display controller 116 sequentially illuminates the yellow segments Y1 to Y5 in synchronism with the operation timing of the platen 10 in accordance with this instruction signal, thereby representing the transfer state using the yellow ink portion of the ink ribbon 15, as shown in FIGS. 20A to 20I. FIGS. 20A to 20D show the states where the paper sheet P and the ink ribbon 15 are conveyed in the forward direction and the transfer operation is performed. FIG. 20E shows the state where the transfer operation is finished. FIGS. 20F to 20I show the state where the paper sheet P is conveyed in the reverse direction. FIG. 20I shows the state where the reverse conveyance of the paper sheet P is finished.

In the above state, when the leading end alignment of the magenta ink portion of the ink ribbon 15 is performed, the same transfer start instruction signal as that described above is supplied to the display controller 116 from the main controller 100. The display controller 116 sequentially illuminates the yellow and magenta segments Y1 to Y5 and M1 to M5 in the order named in synchronism with the operation timing of the platen 10 in accordance with this instruction signal, thereby representing the transfer state using the magenta ink portion of the ink ribbon 15, as shown in FIGS. 21A to 21I.

The reverse conveyance of the paper sheet P and the head alignment of the cyan ink portion are respectively performed in the same manner as described above. Thereafter, when the display instruction signal is generated in synchronism with the transfer start instruction signal from the main controller 100, the display controller 116 sequentially illuminates the yellow, magenta, cyan segments Y1 to Y5, M1 to M5 and C1 to C5 in the order named, thereby representing the transfer state using the cyan ink portion of the ink ribbon 15, as shown in FIGS. 22A to 22I.

Furthermore, when the transfer operation using the cyan ink portion is finished, the display controller 116 illuminates the yellow, magenta, cyan and black segments Y1 to Y5, M1 to M5, C1 to C5 and B1 to B5 in the order named, thereby sequentially representing the transfer states using the black ink portion of the ink ribbon 15, as shown in FIGS. 23A to 23E.

The above descriptions are made using an ink ribbon having four color portions. However, when a single color ink ribbon is used, the transfer states are represented, for example, as shown in FIGS. 20A to 20E.

According to the second embodiment described above, the segment S29 is provided as an operation displaying portion of the pattern display unit 8, and sequentially represents the transfer state. Therefore, since the operator can confirm the transfer state at a glance, the range of practical applications of the copying machine according to this embodiment is considerable.

Furthermore, since the graphical representations correspond to the construction of the copying machine, the copying machine of this embodiment has the advantage of easy recognition.

The display unit is not limited to a liquid crystal, and other display elements can be used.

Various changes and modifications are deemed to lie within the spirit and scope of the present invention.

For example, the image forming apparatus is not limited to a copying machine, but also applies to a printer or a facsimile system. The image forming method is also not limited to the thermal transfer method, but may also include a wire dot, an electrophotography, or an ink jet method.

What is claimed is:

1. An image forming apparatus comprising:
    means for forming a color image on an image forming medium by sequentially forming color component images superimposedly on each other; and
    displaying means for representing the image forming medium, a displaying area of said displaying means being gradually increased in accordance with the progress of image formation by said forming means in order to indicate steps of an image forming process.

2. An apparatus according to claim 1, further comprising second displaying means for representing the image forming medium, a displaying area of said second displaying means being gradually decreased in accordance with the progress of image formation by said formation means in order to indicate the steps of the image forming process.

3. An apparatus according to claim 1, in which said displaying means comprises a color liquid crystal display panel.

4. An apparatus according to claim 1, wherein:
said forming means forms each of the color component images while said image forming medium is moved in a forward direction from an image forming start position, said image forming medium being moved in a reverse direction to said image forming start position after of each of the color component images is formed, and
said displaying means represents a current position of said image forming medium.

5. An apparatus according to claim 1, in which said image forming means is a thermal transfer color copying machine wherein a document is scanned so as to read out image signals corresponding to said color component images therefrom, and the color component images are transferred to said image forming medium which comprises a copying paper sheet from a multi-color ink ribbon to be superimposed on each other by heating a thermal head in accordance with the corresponding image signals, thereby obtaining a color copy; and said displaying means represents a conveying position of said copying paper sheet, the color of the ink ribbon from which a corresponding color component image is being transferred during the thermal transfer operation, and the corresponding color component image which is being transferred to the copying paper sheet.

6. An apparatus according to claim 1, in which said displaying means is formed by combining color LCD segments representing said color component images into a mosaic pattern.

7. An apparatus according to claim 1, in which said displaying means is formed by sequentially arranging color LCD stripes representing said color component images.

8. An apparatus according to claim 1, in which said displaying means includes a plurality of display segments provided at different locations, said display segments being sequentially lit in accordance with movement of the image forming medium.

* * * * *